US008523646B2

(12) United States Patent
Morimoto

(10) Patent No.: US 8,523,646 B2
(45) Date of Patent: Sep. 3, 2013

(54) PROGRAM FOR RACING GAME DEVICE, STORAGE MEDIUM STORING THE PROGRAM, AND RACING GAME DEVICE

(75) Inventor: Kenjiro Morimoto, Tokyo (JP)

(73) Assignee: Sega Corporation, Tokyo (JP)

( * ) Notice: Subject to any disclaimer, the term of this patent is extended or adjusted under 35 U.S.C. 154(b) by 1203 days.

(21) Appl. No.: 12/213,336

(22) Filed: Jun. 18, 2008

(65) Prior Publication Data

US 2009/0005139 A1 Jan. 1, 2009

(30) Foreign Application Priority Data

Jun. 29, 2007 (JP) ................................ 2007-173257

(51) Int. Cl.
*G06F 13/00* (2006.01)
(52) U.S. Cl.
USPC ...................... 463/6; 463/30; 463/36; 463/20
(58) Field of Classification Search
None
See application file for complete search history.

(56) References Cited

U.S. PATENT DOCUMENTS

| 7,534,168 | B2 * | 5/2009 | Bennett et al. | 463/20 |
| 2002/0169013 | A1 * | 11/2002 | Serizawa et al. | 463/6 |
| 2006/0116202 | A1 * | 6/2006 | Nakajima | 463/30 |
| 2008/0125224 | A1 * | 5/2008 | Pollatsek | 463/36 |

FOREIGN PATENT DOCUMENTS

| JP | 2001-204967 | 7/2001 |
| JP | 2006-166980 | 6/2006 |
| WO | 2007/029811 | 3/2007 |

OTHER PUBLICATIONS

Nintendo Co., Ltd., Mario Kart 64, 1997, pp. 1-35.*
The Super Family Computer perfect capture series 16 Winning Strategy Super Mario Kart, New revised version, Futabasha Inc, p. 23 (A), including English translation.
Wave Race 64 Nintendo Official Guide, First Edition, Shogakukan Inc, Nov. 10, 1996, p. 44 (B), including English translation.

* cited by examiner

*Primary Examiner* — Paul A D'Agostino
(74) *Attorney, Agent, or Firm* — Wenderoth, Lind & Ponack, L.L.P.

(57) ABSTRACT

A racing game device comprises means for setting paths in a virtual space in advance as a course for a moving object, means for setting a first path used during normal moving and a second path used only while a special mode is activated, and means for allowing the moving object to move onto the second path (e.g., a ceiling surface part) when the special mode (e.g., a mode allowing the operation of gravity) is activated by an activation instruction from the operating means. Further, the racing game device includes means for setting, while a moving object is moving on the second path, a merging point which merges with the first path when it is judged that a predetermined condition is fulfilled, and means for allowing, when it is judged that the predetermined condition is fulfilled, the moving object moving on the second path to merge at the merging point.

11 Claims, 18 Drawing Sheets

PROGRAM FOR RACING GAME DEVICE, STORAGE MEDIUM STORING THE PROGRAM, AND RACING GAME DEVICE

TECHNICAL FIELD

The present invention relates to a program for a racing game device that allows a plurality of moving objects, including a moving object controlled by a player, to compete with each other in a virtual space, a storage medium storing the program, and a racing game device.

BACKGROUND ART

Racing game devices allowing an individual's own virtual vehicle and vehicles operated by other players to move and to compete with each other in a virtual space are widely known. In such racing game devices, in general, moving objects such as vehicles are allowed to move on courses set in a virtual space, and they compete with each other on order of finishing or on distances covered within a predetermined time limit. A plurality of courses are set in the virtual space and players can select a desired course, but when the moving objects are allowed to move just on set courses, there is a possibility that the players may lose interest.

In recent years, racing game devices having ingenious courses have been proposed in which obstacles are provided on a course or a vehicle is allowed to move on a course separate from the original course. For example, a game device has been proposed in which an event, for example, allowing a cat to run onto a course, is generated, and in accordance with the response of an operator with regard to the event, a moving object (such as a vehicle) is allowed to move onto another route from a diverging point of the course (See, for example, Japanese Patent Application Laid-Open Publication No. 2001-204967). A racing game is provided that allows a moving object to move in a virtual space in which an imaginary vehicle that allows a special area to be generated is used as a moving object in order to produce a race. In the racing game, a moving object generates a special area, and under that condition another moving object enters the special area to perform a special operation, thereby allowing the moving object to move onto a different course from the prearranged course or courses, such as a course constructed over the top of a normal course (See, for example, WO07/029,811).

SUMMARY OF INVENTION

Problems to be Solved by the Invention

As described above, conventional racing game devices having ingenious courses have been proposed in which obstacles are provided on a course or a vehicle is allowed to drive on a course separate from the original course. However, in the game device allowing a moving object to move onto another route from a branch point of a course in accordance with the response of a player against an event, players play utterly different routes, thereby prohibiting the players from feeling a sense of togetherness. Furthermore, even if a moving object can move onto another route, once it has passed therethrough, it moves on the same route as before, thereby raising the possibility that the player will lose interest.

Meanwhile, in the game device using an imaginary vehicle that allows a special area to be generated, unreal stage effects unique to a virtual game entertain players, yet a sense of exhilaration, a sense of dynamism, and unpredictability are further demanded. Furthermore, by performing a special action in the special area, a moving object is allowed to enter another route and move thereon, but the special area is required to be generated by another moving object, making it difficult for an individual's own vehicle to enter the special area.

The present invention has been developed in view of the above-mentioned problems. One object of the present invention is to provide a program for a racing game program, a storage medium storing the program, and a racing game device which allows a course on which a moving object moves to not be fixed and as such, the moving object can move onto an unspecified large number of courses. Another object of the present invention is to provide a program for a racing game program, a storage medium storing the program, and a racing game device that allows for the production of a race unique to virtual space which is full of unpredictability and is physically impossible in the real world.

Means for Solving the Problems

The present invention relates to a program for a racing game device, a storage medium storing the program, and a racing game device, and the above-described object of the present invention for the program is achieved by a computer program embodied in a computer readable medium that allows a computer of a game device provided with operating means controlled by a player, and image display means for displaying images on a monitor, to perform game processing steps including an image information generation step for generating game images including images such as a moving object moving in a virtual space in response to the control of said operating means, wherein said game processing steps include: a step for setting a plurality of paths in the virtual space in advance as a course for said moving object; a step for setting, for said plurality of paths, a first path used during normal movement and a second path used only while a special mode is activated; a step for judging whether or not each moving object fulfills a first condition; a step for allowing, when said special mode is activated by an activation instruction from said operating means controlling a moving object which has been judged to fulfill said first condition, the moving object to move onto said second path; a step for judging whether or not a moving object, while moving on said second path, fulfills a second condition; a step for setting, when it is judged that said second condition is fulfilled, a merging point which merges with said first path; and a step for allowing, when it is judged that said second condition is fulfilled, the moving object moving on said second path to merge at said merging point.

The above-described object of the present invention is achieved more effectively by allowing said special mode to be a mode allowing the direction of physical gravity to be designated by the control of said operating means, allowing said second path to be a path having a course which is physically impossible in the real world, allowing said second path to include either one of a path setting a wall surface section of a moving object including a train to be a course, a path setting a ceiling surface section of a building to be a course, or a path setting a wall section of a building to be a course, allowing said game processing steps to further include a step for changing the direction of said physical gravity to a direction designated by said operating means, allowing virtual gravity to act in the changed direction, and performing ejection processing for ejecting a moving object controlled by said player in the designated direction, allowing said game processing steps to further include a step for adding the energy value of said virtual gravity in accordance with the passage of time for the duration from the time of activation of said special mode to the time of issue of an instruction for releasing the energy of said virtual gravity toward said designated direction and storing said added value in a storage means as a charge amount, and wherein said step for performing ejection processing converts a force acting upon the moving object controlled by said player into a speed corresponding to the charge amount of said virtual gravity when the instruction for releasing the energy of said virtual gravity is issued and ejects said moving object at the converted speed, allowing the range of the virtual gravity acting in the direction designated by said operating means to be within a special gravity space set around the moving object controlled by said player, allowing said game processing steps to further include a step for eliminating the gravity in said special gravity space and performing processing for floating objects within said special gravity space including the moving object controlled by said player in accordance with the passage of time for the duration from the time of activation of said special mode to the time of issue of an instruction for releasing the energy of said virtual gravity toward said designated direction, allowing said game processing steps to further include a step for performing image processing which gradually changes a distortionless, normal object shape into an object shape distorted by the action of said virtual gravity on objects influenced by the virtual gravity acting in the direction designated by said operating means, and allowing said game processing steps to further include a step for changing music data for sound output with the activation of said special mode as a trigger when said special mode is activated by the step for activating said special mode, respectively.

The above-described object of the present invention for the information storage medium is achieved by a configuration storing said computer program.

The above-described object of the present invention for the game device is achieved by a game device provided with operating means controlled by a player, image display means for displaying images on a monitor, and game processing means including image information generation means for generating game images including a moving object moving in a virtual space in response to the control of said operating means, wherein said game processing means comprises: means for setting a plurality of paths in the virtual space in advance as a course for said moving object; means for setting, for said plurality of paths, a first path used during normal moving and a second path used only while a special mode is activated; means for judging whether or not each moving object fulfills a first condition; means for allowing, when said special mode is activated by an activation instruction from said operating means controlling a moving object which has been judged to fulfill said first condition, the moving object to move onto said second path; means for judging whether or not a moving object, while moving on said second path, fulfills a second condition; means for setting, when it is judged that said second condition is fulfilled, a merging point which merges with said first path; and means for allowing, when it is judged that said second condition is fulfilled, the moving object moving on said second path to merge at said merging point.

Effects of the Invention

The present invention allows, when a special mode is activated, a special path which is available only during its activation to be used, and sets a merging point which merges with a normal path when the activation of the special mode ends, thereby allowing a course on which a moving object moves to not be fixed and the moving object to move on an unspecified large number of courses. Furthermore, a form provided with a special mode allowing the direction of physical gravity to be designated by the control of operating means can produce a race unique to virtual space which is full of unpredictability and is physically impossible in the real world, in which a moving object is, for example, allowed to move on a ceiling, a wall, or the like as a course therefor by controlling gravity.

Figure 1:
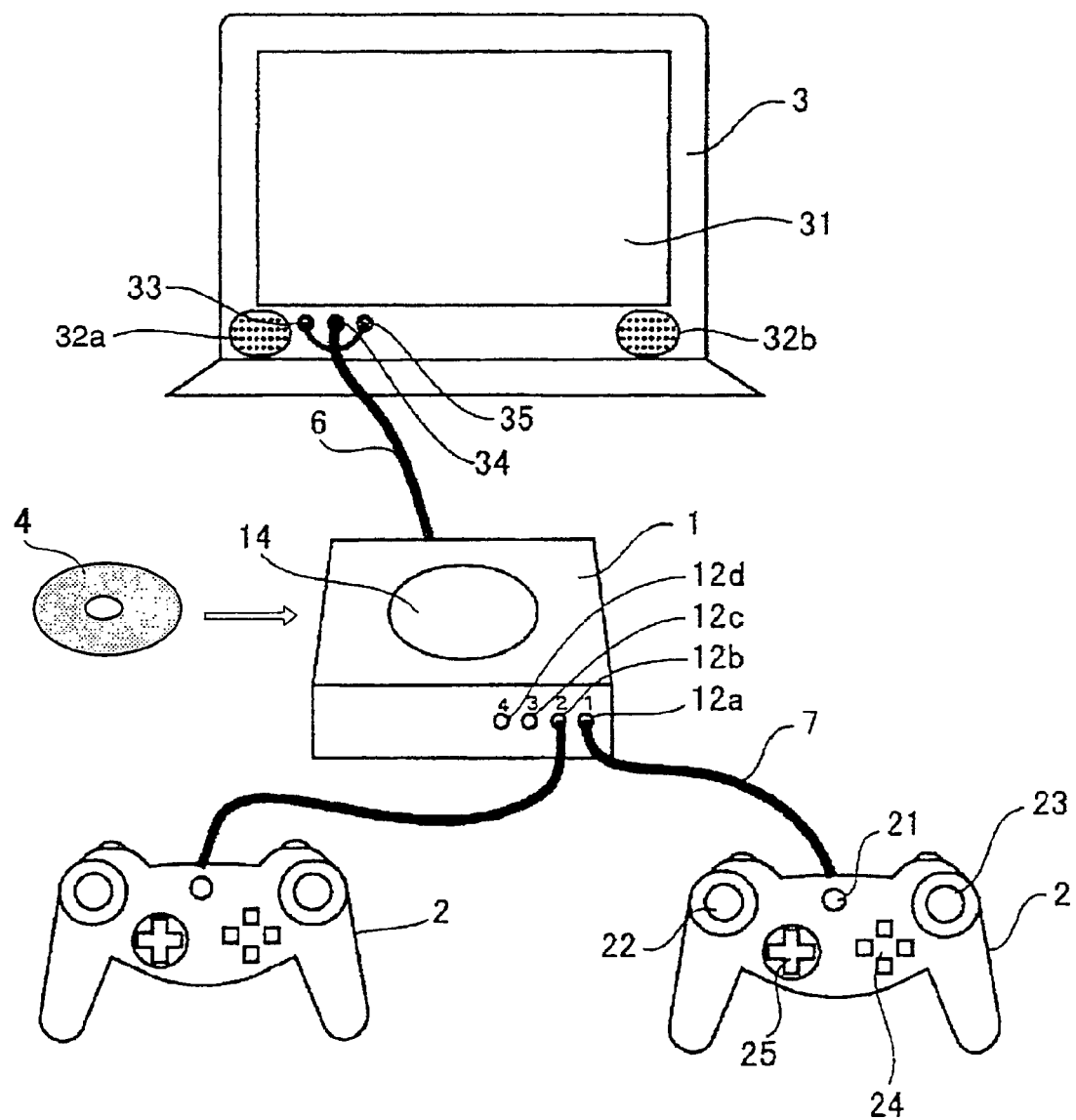
FIG. 1 is an external view showing an example of a home game device to which the present invention is applied.

1 Game machine main unit
2 Controller
3 Television
4 External storage medium
5 Communication network
10 Control board
11 CPU
12 ROM
13 RAM
14 Image processing circuit
14a GPU
14b Graphic memory
15 Sound processing circuit
15a SPU
15b Sound memory
16 Input/output equipment I/F (interface) circuit
16a Controller I/F circuit
16b Image data output I/F circuit
16c Sound data output I/F circuit
16d DVD-ROM reading device I/F circuit
17 Communication I/F circuit
18 Bus
20 External storage medium reading device
50 Course
60 Moving object
61 Character (virtual player)
62 Virtual vehicle
63 Building object
63a Wall (wall surface part)
63b Roof (ceiling surface part)
63c Passage
63d Ticket gate (open/close door part)
63e Elevated railway
63f Wall beside railway track (wall surface part)
63g Building
64a Kicker (leaping board)
64b Stairs
64c Turbulence
65 Item
66 General vehicle object
66a Taxi
66b Train
70 Virtual camera
NP Normal path
SP Special path
SPa Diverging point
SPb Merging point

DESCRIPTION OF EMBODIMENTS

Hereinafter preferred embodiments of the present invention will be described with reference to the drawings.

FIG. 1 is an external view of an example of a home game device to which the present invention is applied, and the game device shows an example of a general home game device. In FIG. 1, the main unit 1 of the game device (hereinafter referred to as "game machine main unit") is provided with input terminals (12a to 12d) for control signals and output terminals for video signals and audio signals, to which a controller 2 controlled by a player connected through a connecting cable 7, and a display device 3 is connected to through a video/audio connecting cable 6.

Game software (a game program and control data) for allowing a computer to function as a game processing means is, in the present example, stored in an external storage medium 4. The external storage medium 4 (being a DVD-ROM in the present example) is loaded from the section of a casing provided in the game machine main unit 1. The display device 3 as an image display means is, in the present example, a television, which is provided with a display (an image display device) 31, speakers 32a, 32b, and video/audio input terminals (a video signal input terminal 33 and an audio signal input terminals 34 and 35).

A start button 21 for giving instructions about the start of a game, analog joysticks 22 and 23, a control button 24, and an arrow key 25 are arranged in the controller 2. Various functions are assigned to these input control switches in accordance with the game to be played. In the present example four controllers 2 can be connected to the game machine main unit 1, allowing a maximum of four players to simultaneously participate in one game in order to enjoy the game.

In such a configuration the game device performs the game program on the basis of input control information output from the controller or controllers 2, generates image data and audio data relating to the game, displays game images on a monitor (the display 31) of the television 3, and allows the speakers 32a, 32b to generate sound effects or the like.

Figure 2:
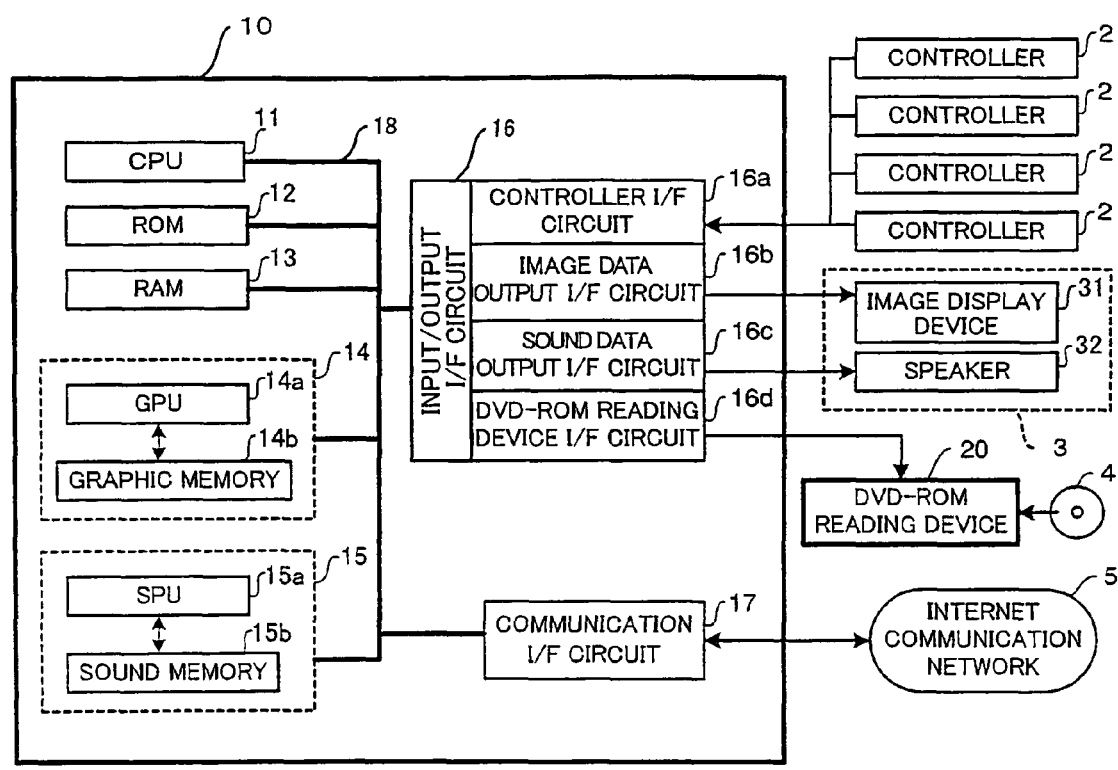
FIG. 2 is a block diagram showing an example of a hardware configuration of the home game machine exemplified in FIG. 1.

FIG. 2 is a block diagram showing an example of a hardware configuration of the game device exemplified in FIG. 1. The game machine main unit 1 incorporates a control board 10 and a reading device 20 (being a ROM reading device in the present example) for reading the external storage medium 4. For convenience with respect to the description, the entire information processing means for performing the processing of a racing game of the present invention is defined as "game processing means," and the image information generation means and sound information generation means will be described as partial configuration elements of the game processing means.

Installed on the control board 10 is a main CPU (Central Processing Unit) 11 as the game processing means operating in accordance with the game program, a ROM (Read Only Memory) 12 and a RAM (Random Access Memory) 13 as the main storage means, an image processing circuit 14 for generating video signals to be output to the image display device 31 on the basis of image information generated by the game program, a sound processing circuit 15 for generating sound signals to be output to the speaker 32, an input/output equipment I/F (interface) circuit 16 as an input/output operating means, and a communication I/F circuit 17 as a communication operating means, and these are connected through a bus 18.

The ROM 12 stores basic software such as a startup program for the game device. The RAM 13 temporarily stores movement information of a moving object, topographic information of a virtual space, or the like, which are obtained in accordance with the progress of the game.

The image processing circuit 14 comprises a GPU (Graphic Processing Unit) 14a, which operates in response to instructions from the CPU 11, and a graphic memory 14b, and on the basis of the image information (being information on a polygon shaped object modeled in a three-dimensional virtual space, a virtual light source, a virtual camera, or the like) generated in accordance with the game program allowing the CPU 11 to function as the image information processing means, performs coordinate transformation processing from the three-dimensional coordinates to the two-dimensional coordinates and rendering processing (image processing by shading, texture mapping, use of the ray tracing method, the radiosity method, or the like), and performs processing allowing the image display device 31 to display game images. In a game device which is not provided with an auxiliary processor for three-dimensional graphics processing such as the GPU 14a and a rendering processor, the above-described coordinate transformation processing and rendering processing are performed by the game program.

The sound processing circuit 15 comprises an SPU (Sound Processing Unit) 15a and sound memory 15b, and on the basis of sound information generated in accordance with the game program allowing the CPU 11 to function as the sound information generation means, performs processing for generating sound data such as sound effects and the outputting of sound signals.

The I/F circuit for input/output equipment 16 is, in the present example, provided with a controller I/F circuit 16a, an image data output I/F circuit 16b, a sound data output I/F circuit 16c, and a DVD-ROM reading device I/F circuit 16d. The communication I/F circuit 17 is a communication operating means for use in online games performed through a communication network 5 such as an Internet communication network.

The controller 2 as a moving object operating means controlled by a player is not limited to the configuration of the controller 2 exemplified in FIG. 1, and may be a controller that allows information input by the player to be transmitted to the game device, such as a wireless controller, a controller provided with a sensor for detecting the movement of the controller itself (a sensor for detecting the position and direction of the controller with respect to the screen, the inclination and acceleration in the X, Y, and Z-axes thereof, or the like), and a controller consisting of pointing devices such as a touch panel and digitizer. The external storage medium 4 storing the game software (being the game program and data) is not limited to a DVD-ROM, and can be any computer-readable information storage medium. The external storage medium 4 and its reading device 20 are not needed if the game software is in a form which is downloaded to the RAM 13 within the game machine main unit 1 or to other internal storage media through a network.

A computer game of the present invention will now be outlined.

The present invention is favorably applied to a computer game (referred to as "racing game") that allows a plurality of moving objects including a moving object moving in response to the control of a player to compete with each other within a virtual three-dimensional space. Hereinafter, the application of the present invention to a racing game will be described by way of example.

Figure 3:
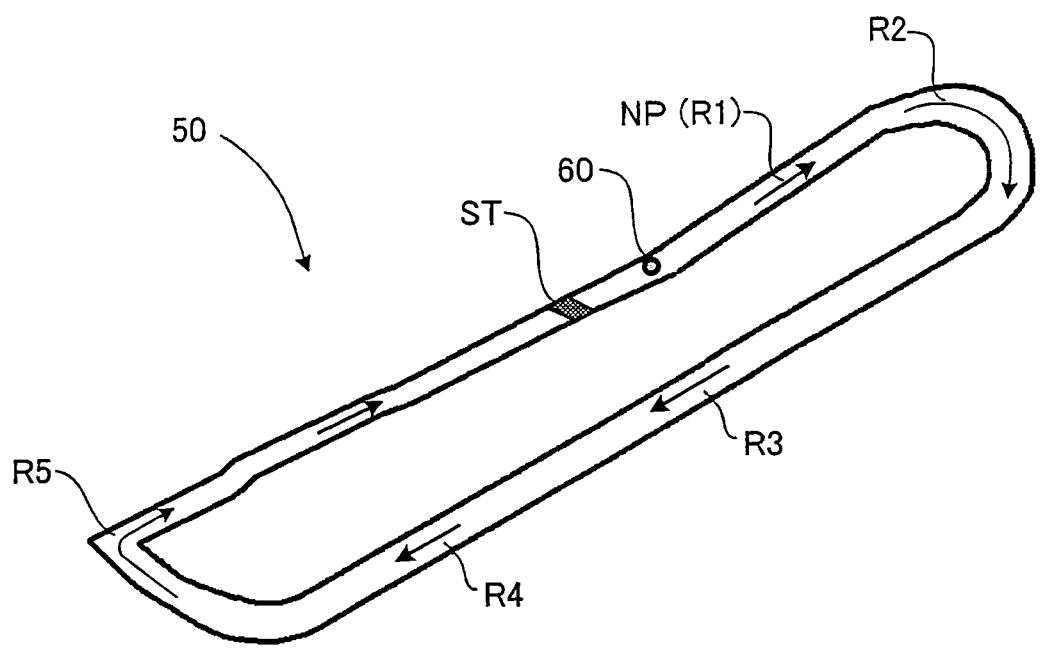
FIG. 3 is a schematic diagram showing an example of the basic configuration of a course of the present invention.

FIG. 3 shows an example of the basic configuration of a course 50 set in a virtual space. The racing game of the present embodiment is a game in which a plurality of moving objects 60 including a moving object controlled by a controller (hereinafter referred to as "player") move on the course 50 having a three-dimensional shape set in the virtual space and compete with each other. In the example of the course 50 shown in FIG. 3, each moving object 60 controlled by the player or the CPU starts from a starting point ST and moves around the circular course 50 a prescribed number of times, and victory or defeat is determined by the order in which they reached a goal point (the point ST or other points). A course NP along arrows R1 to R5 shown in FIG. 3 is a first path (hereinafter referred to as "normal path"), and in addition to that, a second path (hereinafter referred to as "special path") is set as a special course which can be used during activation of a special mode, which will be described later.

Figure 4A:
FIG. 4A is a schematic diagram showing an example of a moving object of the present invention.
Figure 4B:
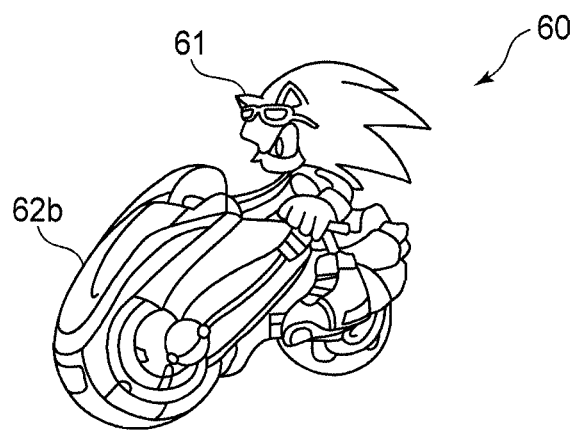
FIG. 4B is a schematic diagram showing an example of a moving object of the present invention.
Figure 4C:
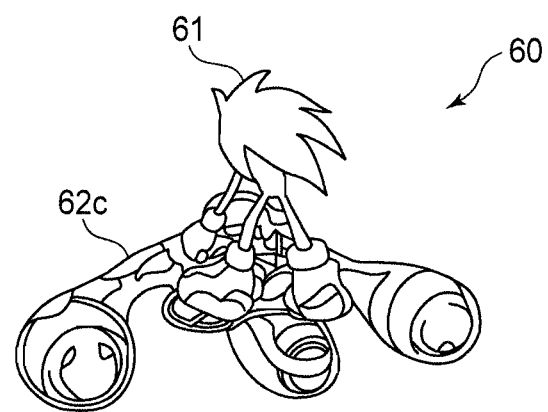
FIG. 4C is a schematic diagram showing an example of a moving object of the present invention.

The moving object 60 moving on the course 50 is a virtual vehicle 62 mounted by a character (a virtual player) 61 shown in FIGS. 4A to 4C. A virtual vehicle 62a shown in FIG. 4A is an imaginary vehicle called an "air ride" with a shape that allows for the formation of an air layer between it and the ground by use of air power and which slides over the air like a snowboard or a surfboard. A virtual vehicle 62b shown in FIG. 4B is a vehicle like a motorcycle which moves in contact with the ground. A virtual vehicle shown in FIG. 4C is an imaginary vehicle 62c called "wheel yacht" with a shape that allows for the formation of a sea layer between it and the ground and which slides over it like a speedboat.

The player controls the action of these moving objects 60 by use of a controller. For example, when using the controller 2 exemplified in FIG. 1, the acceleration or deceleration of the virtual vehicle 62 is controlled through the pressing operation of the control button 24. When the center of gravity of the moving object 60 is desired to be moved by inclining the attitude of the character 61 horizontally, or the virtual vehicle 62 is desired to be moved vertically and horizontally, its direction is controlled by the tilting operation of the analog joystick 22 or 23. When the direction of physical gravity (G) is desired to be changed during activation of the special mode, which will be described later, also, the direction of gravity is designated and changed by the tilting operation of the analog joystick 22 or 23.

Different movement performances such as acceleration performance, deceleration performance, cornering performance, maximum speed, jumping ability, steering response, and fuel efficiency are assigned to these virtual vehicles 62, respectively, and parts for changing the movement performance of the virtual vehicles 62 are provided. The player selects a virtual vehicle 62 based on his/her personal preference in accordance with a course location from various types of virtual vehicles 62 available and takes part in a race. The character 61 mounting the virtual vehicle 62 is also able to be selected from a number of different types, and the player can select a character in accordance with his/her personal preference. The vehicle 62 in the initial stage is set in advance to be, for example, the vehicle 62a (air ride) shown in FIG. 4A. The player, thereafter, can purchase a vehicle in accordance with his/her personal preference using points accumulated in the race. In another possible form, the player can purchase parts to customize his/her vehicle.

Figure 5:
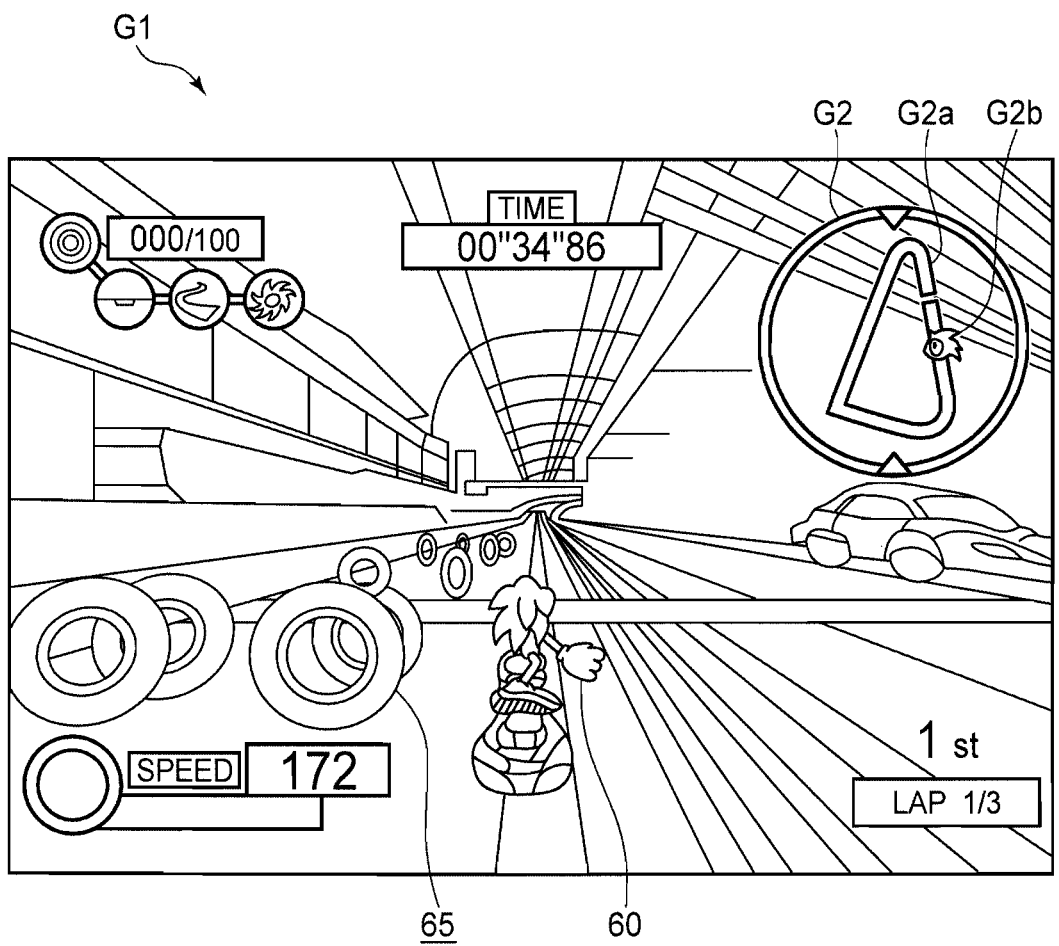
FIG. 5 is a figure showing an example of an image of a racing game of the present invention.

FIG. 5 shows an example of a game image while the moving object 60 moves on the normal path NP. As shown in FIG. 5, in the game image an image obtained by capturing the moving object 60 using a virtual camera is displayed on a screen G1, with a course map G2 superimposed at a predetermined position on the screen G1. In the course map G2, for example, a reduced drawing G2a of the entire course with a symbol image G2b indicating the present position of the moving object 60 is displayed. On the screen G1 information on present lap time, moving speed, the number of laps, or the like are displayed as information indicating moving conditions. A ring-shaped item 65 shown in FIG. 5 is an item which allows the moving object 60 to accumulate points by passing through its ring portion and acquiring it. The point in the present example is virtual money, which is used to purchase vehicles and/or parts.

The special mode and special path (special course) of the present will now be described.

The racing game of the present invention involves speeding in a virtual space and not moving on roads generally provided in the real world, and allows for the production of a race unique to being within a virtual space. The course 50 set in the virtual space includes the normal path NP exemplified in FIG.

3 and the special path in which movement thereon is enabled only during the activation of the special mode. The moving object can move onto the special path when it fulfills a predetermined condition. In the present embodiment, the player controls the gravity around the moving object 60 using the controller 2, and judges that, for example, the moving object 60 fulfills the predetermined condition, allowing it to move onto the special path such as a ceiling or a wall, on which it cannot normally move owing to the action of the gravity.

The control of gravity (G) will now be described. Gravity acting on the moving object 60 in the real world is a result of universal gravitation and centrifugal force caused by the rotation of a celestial body (being the Earth) and acts in the direction nearly perpendicular to the XZ plane (horizontal plane) of the three-dimensional coordinate system. In the virtual world of the computer game of the present invention, the direction in which gravity acts can be changed through the control of the controller 2. In other words, in exchange for eliminating physical gravity in the real world, an imaginary gravity (referred to as "virtual gravity"), which can be controlled by the player, is generated. The "physical gravity" in the present invention means a gravity which acts in the three-dimensional virtual space in the same direction as in the real world. The "virtual gravity" in the present invention indicates a gravity which can be controlled by the player, and means specifically a gravity which acts in the changed direction when the direction of the physical gravity is changed to a direction designated through the control of the controller 2 in the special mode, and also means a gravity which can be controlled by the player. Hereinafter, for convenience with respect to the description, "virtual gravity" is described as "gravity" except in cases where the both meanings are likely to be confused with each other.

In the below description, a mode in which the control of gravity is enabled is defined as "special mode," and the control of gravity in the special mode (being the control of the direction change of the physical gravity, the control of charging virtual gravity energy, the control of releasing virtual gravity energy, or the like) is defined as "gravity control."

Gravity operating means an action in which a virtual gravity is charged by absorbing the physical gravity around the moving object 60, thereby generating a weightless state in which the charged gravity (the energy of the virtual gravity) is released in a designated direction, thereby allowing the moving object 60 and surrounding objects to fall (to be given a speed equal to gravity). Controls by the player include, for example, the ability to instruct the activation of the special mode (the activation of gravity control) by the pressing operation of a specific control button 24 and the ability to instruct the direction of gravity by the tilting operation of the analog joystick 23 (or by control of the arrow key 25). An instruction for releasing the charged gravity is performed by the pressing operation of the specific control button 24. The release of the gravity ejects gravity in the instructed direction. Speed provided to the moving object 60 by the gravity, in the present embodiment, depends on the period of duration of a weightless state (i.e., the charge amount of gravity). Gravity energy is converted into speed in accordance with the charge amount of gravity so that the greater the charge amount of gravity, the greater the speed the moving object 60 has, and the moving object 60 is, accordingly, provided with that speed.

In the racing game of the present invention, the above-described gravity control enables the movement of the moving object 60 on the special path, such as a tunnel ceiling part having a moving surface, which is physically impossible in the real world owing to the action of gravity.

The special path enabled in the special mode will now be described.

Figure 6:
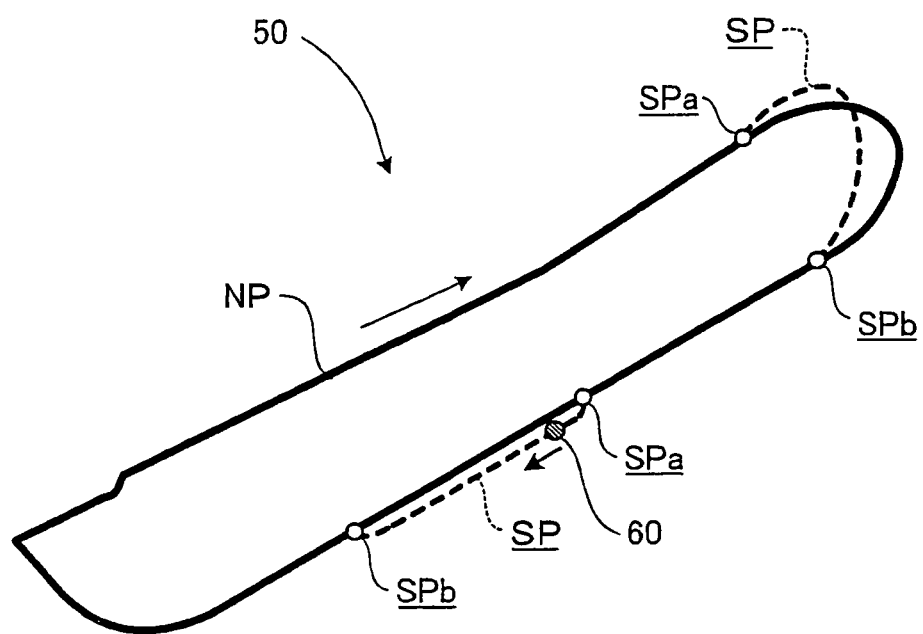
FIG. 6 is a figure illustrating a special path of the present invention.

FIG. 6 shows an example of a course 50 in which special paths are set. In the present example, two special paths SP diverging from a normal path NP are set. The special path SP includes the walls and ceiling of structures (being a guardrail, a building, or the like), and the type of special path SP will be described with reference to embodiments provided herein. In the course 50, the player activates a special mode immediately before the moving object reaches a diverging point SPa for the special path SP, charges the gravity therearound to form a weightless state, and changes the gravity direction to the direction of the special path SP, thereby allowing the moving object 60 to move onto the special path SP. The course of the moving object 60 is changed to the special path SP starting from the diverging point SPa, allowing the moving object 60 to move on the route of the special path SP. The moving object 60 merges with the normal path NP at the merging point SPb to move back onto the original normal path NP.

Processing forms for returning the moving object 60 from a topographic feature such as a wall or a ceiling (being a course on the special path SP) to the ground on a global axis (the merging point SPb of the normal path NP) are, for example, as follows:

(T1) A processing form for providing a gimmick (a leaping board or the like) for separating the moving object 60 from the ground and returning it to the ground by allowing it to compulsorily fall from the topographic feature.

(T2) A processing form for gradually changing the angle of the topographic feature to turn it continuously in the minus direction of the Y-axis indicating the height direction on the global axis.

(T3) A processing form for returning it to the ground in accordance with the gravity controlled by a player using the G control as is the case when moving to a wall or a ceiling.

In the processing forms (T1) and (T2), the cancellation of the special mode is automatically performed at the merging point SPb set at the end of the special path NP. In the processing form (T3), when the activation of the special mode is cancelled (terminated) through the control of the player, or when, for example, the entire charge amount of gravity has been consumed before the merging point SPb, the special mode is cancelled on the special path SP, allowing gravity to return to the original gravity direction. In that case, a merging point is set when the activation of the special mode is terminated, allowing the moving object moving on the special path to merge with the normal path at the merging point.

In the present embodiment, a form has been described in which the special mode is enabled to be activated only under the condition that an instruction to control gravity has been performed. In another possible form, the special mode may be enabled to be activated when specific conditions are fulfilled, with points obtained through the acquisition of specific items, moving time, the number of laps, ranking order, distance between moving objects, or the like as elements. The special path SP may set a path which cannot be used unless a specific switch object is operated in addition to a path which is available at all times when the direction of gravity control is correct. For example, a switch can be placed, which, when gravity control has enabled access to a route which is normally unavailable, can influence a succeeding moving object (or a moving object controlled by the player himself/herself, or a moving object preceding the moving object controlled by the player) moving on a general route arranged only on a route which is normally unavailable. By placing a switch like this, the player is not only allowed to move only on a route which is normally unavailable, but is also allowed to actively search for a switch placed on a route which is normally unavailable, allowing the player to advance the game more advantageously. For example, a moving object of a preceding player runs over a switch which allows a hidden route to be exposed, thereby generating a situation in which a moving object of a succeeding player can move advantageously, too. Such an event includes a form allowing a moving object to run over the switch and a form allowing the switch to be operated through the action of weightlessness (−G) in the special mode which will be described later or through the action of gravity (+G) by controlling the gravity direction.

The special path SP includes one in which a diverging point SPa and a merging point SPb are fixed at both ends of a course, one in which a diverging point SPa is set when the moving object 60 moves from the normal path NP to the special path SP and one in which a merging point SPb is set when the moving object 60 returns from the special path SP to the normal path NP, such as, for example, when a diverging point SPa onto a special path SP, which appears by the opening of a hidden door, is fixed. In contrast, for a special path SP in space moving through the space with a weightless state, a diverging point SPa to the special path SP is set on the activation of a special mode, and is variable. The merging point SPb is automatically set when, for example, the activation of a special mode is terminated by the instruction of the player as described above, and is variable. In that case, for example, the point of intersection of the line in the gravity direction passing through the center of the moving object with respect to the road surface of the normal path is set to be a merging point.

The action of gravity during the activation of the special mode will now be described with reference to the embodiments relating to the special paths.

Figure 7A:
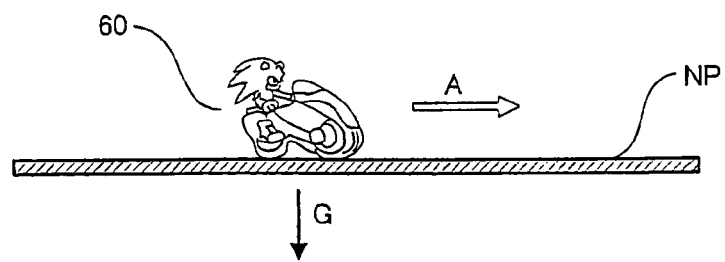
FIG. 7A is a figure illustrating the moving state of a moving object on a special path of the present invention.
Figure 7B:
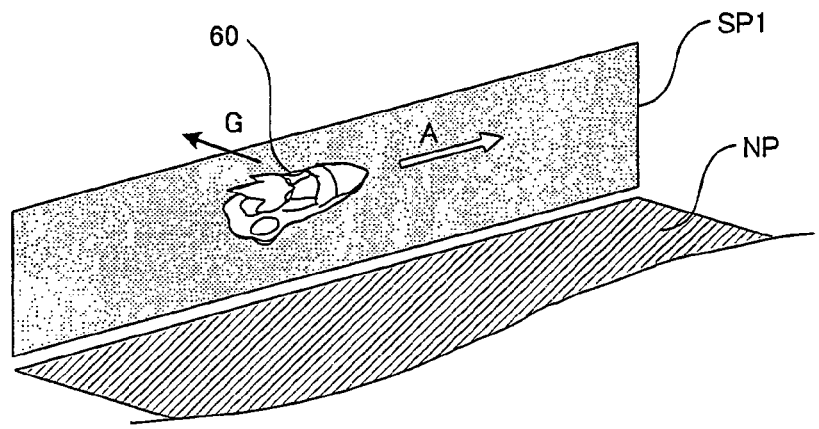
FIG. 7B is a figure illustrating the moving state of a moving object on a special path of the present invention.
Figure 7C:
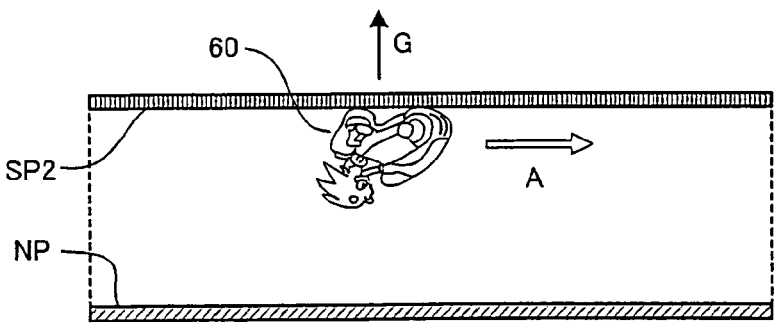
FIG. 7C is a figure illustrating the moving state of a moving object on a special path of the present invention.
Figure 7D:
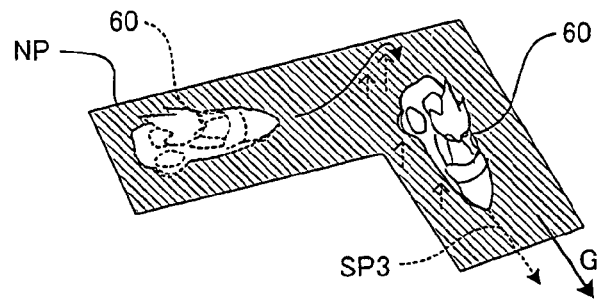
FIG. 7D is a figure illustrating the moving state of a moving object on a special path of the present invention.

FIG. 7A shows a situation in which the moving object 60 is moving on the normal path NP in the moving direction A. In FIG. 7A, on the normal path NP, gravity G acts perpendicular to its road surface, assuming that the road surface of the normal path NP is a horizontal surface. In the present embodiment, as courses to be used in the racing game, in addition to the normal path NP, special paths (SP1 to SP3) shown in FIGS. 7B to 7D are set in advance or set dynamically, and by controlling gravity G, a moving object is allowed to move on the special paths SP on which a moving object normally cannot move owing to the action of gravity. The example of FIG. 7B is an example in which a wall surface is set to be the special path SP1. The example of FIG. 7C is an example in which a ceiling surface is set to be the special path SP2. The special path SP3 shown in FIG. 7D is an invisible path, and is a ground path (a path falling (moving through space by force pulling in the G direction) in ground space in the G direction). Specifically, the special path SP3 is a course when the moving object is pulled in the direction of gravity, which is a newly designated G direction, and a state is achieved in which the moving object moves in space through the attracting force or through the attracting force and the inertial force of the moving object when moving to the special path SP.

For example, when the player activates the special mode immediately before the right-angle corner of the normal course NP shown in FIG. 7D, the normal gravity is eliminated, and the moving object 60 floats off the road surface. By generating gravity in the direction of the arrow G shown in FIG. 7D in that condition, the special path SP3 is formed by free fall in the G direction by gravity, and the moving object 60 falls along the special path SP3 (i.e., it moves through the space).

As described above, in the present embodiment, gravity control which is impossible in the real world is enabled, and gravity direction control by a player (or CPU) enables movement using unreal, unpredictable special paths such as a ceiling or a wall surface. For example, the player, using the special paths and gravity energy, can pull ahead of other preceding moving objects, move without being obstructed by a moving object one lap behind, and move at higher speed through a sharp curve and a right-angle corner when compared to drifting and limited grip driving.

Figure 8:
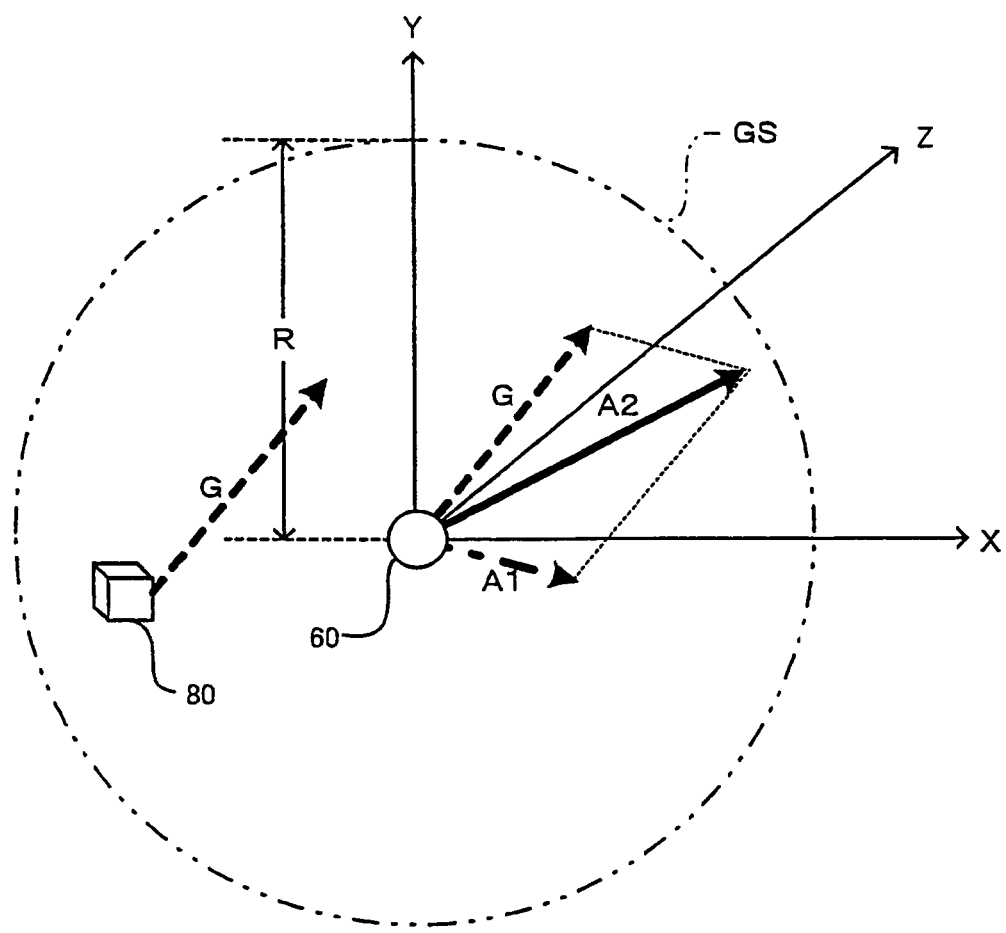
FIG. 8 is a figure illustrating the range of action of gravity in a special mode of the present invention.

The action range of gravity generated during the special mode will now be described with reference to FIG. 8.

The CPU 11 (hereinafter referred to as "game processing means 11") operating in accordance with the game program, on activation of the special mode, sets a three-dimensional space around the moving object 60 to be a range within which gravity G acts. For example, in FIG. 8, assuming that the moving object 60 is approximately 1.5 meters in size, the inside of a spherical space having a maximum radius R of nearly 20 meters with its position as the center is set to be a special gravity space GS (being the action range of gravity G).

The game processing means 11 eliminates the gravity within the special gravity space GS in accordance with the passage of time for the duration from the time of activation of the special mode to the time of issue of an instruction for releasing the gravity, adds the amount of gravity energy, and stores the added value in the RAM 3 as a charge amount. When the instruction for releasing the gravity is input from the controller, gravity G is allowed to act in the direction designated by the control of the controller. The game processing means 11 may allow the gravity G to act on another object 80 (being an object having an attribute which is influenced by gravity) present within the special gravity space GS similarly, and on the basis of gravity information indicating the direction and magnitude of the gravity G, thereby control the action of the object 80. For example, when the object 80 is an object (such as a door of a hidden course or the like) for making the course of a special path set in the course 50 available, in accordance with the attribute information of the object, the object 80 may be flown in the direction of the gravity G, or may be destroyed and erased, and the door of the hidden course (which does not rotate in the gravity direction during normal times, but rotates through a force in a predetermined direction) may be opened.

For the moving object 60, it is moved at a converted speed equal to gravity (or the added valued of the speed and the moving speed at that time), and is instantaneously accelerated. As is shown in FIG. 8, the moving direction and speed of the moving object 60 may be determined by composing a moving speed vector A1 at the activation of the special mode and a gravity speed vector, or on the basis of the information of the composed speed vector A2.

The process forming the weightless state by absorbing ambient energy is preferably a form for generating various events by the influence of weightlessness, such as floating another object 80 present within the special gravity space GS, destroying and erasing the object 80 by the influence of the weightlessness in contrast to the above-described influence of gravity, opening the door of the hidden course, and erasing the wall to allow a normal path or a special path of a new route to appear. The present embodiment is a form for generating the above-described various events by exerting the influence of the weightlessness on the other object 80 when the weightless state is generated without controlling the action of the other object 80 as described above when the gravity energy is released.

The present embodiment predetermines the range of the special gravity space, or may be a form varied by the game processing means 11 in accordance with the type of virtual vehicle 62 (and the type of customized parts) and the type of the character 61 mounting the virtual vehicle 62.

The setting form of the special path of the present invention will now be described with reference to the embodiment relating to a course.

Figure 9:
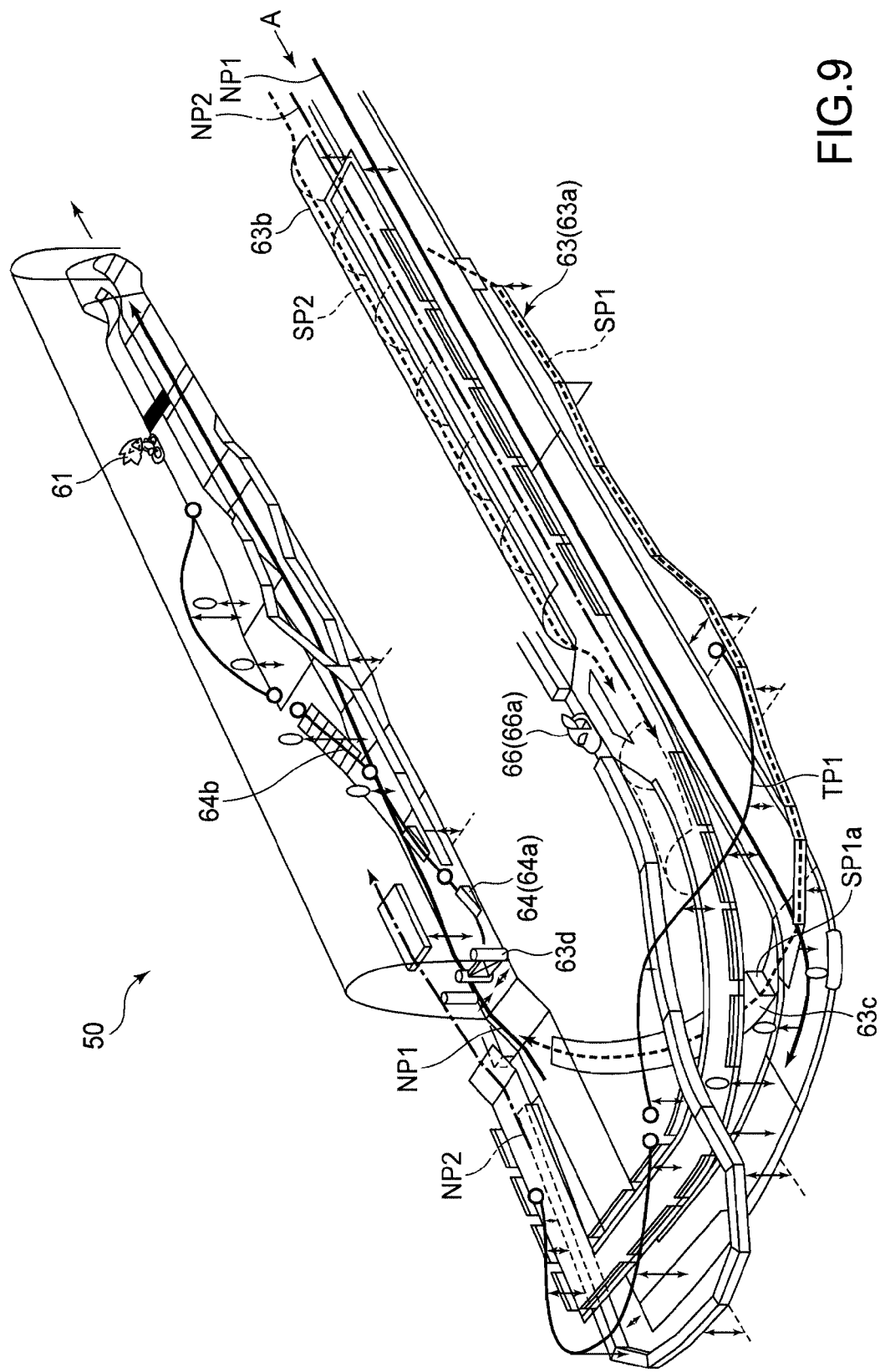
FIG. 9 is a first perspective view showing a configuration example of the main part of a racing course of the present invention.
Figure 10:
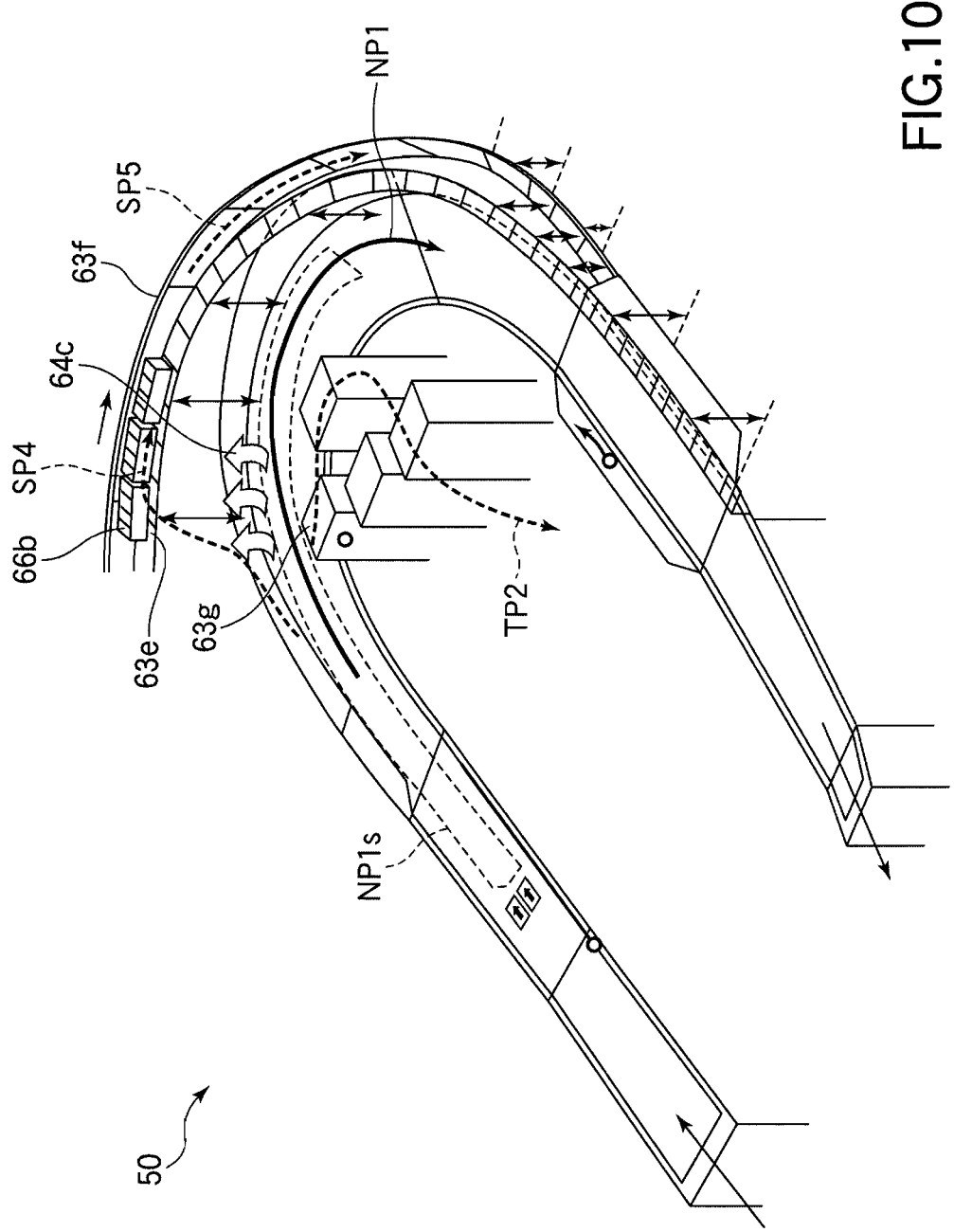
FIG. 10 is a second perspective view showing a configuration example of the main part of a racing course of the present invention.
Figure 11:
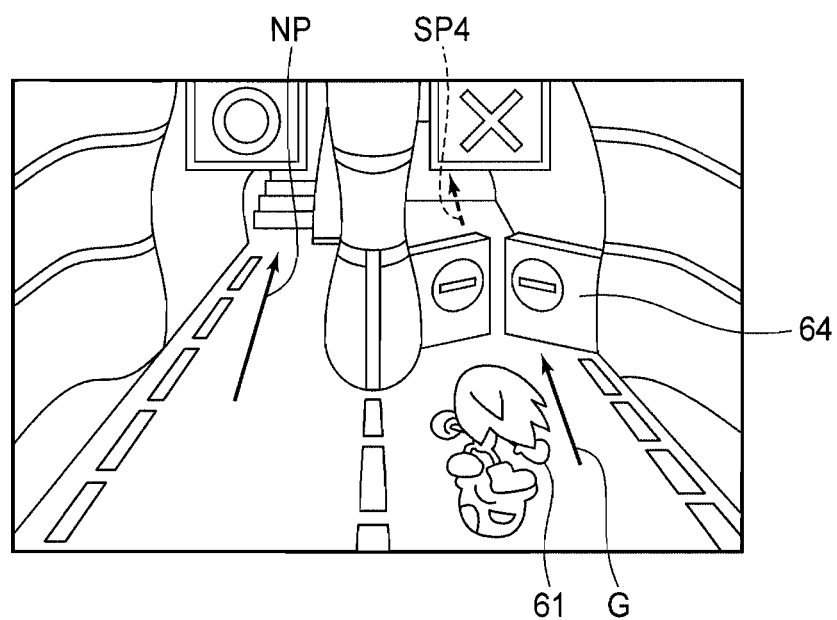
FIG. 11 is a first schematic diagram for illustrating an example for controlling gravity in a special mode of the present invention.

FIGS. 9 and 10 are perspective views showing examples of main parts of the racing course of the present invention. FIG. 9 shows the left part of the course 50 exemplified in FIG. 3, while FIG. 10 shows the right part thereof. In FIG. 9, a route in the direction of the arrow A is provided with a normal path NP1 and a second normal path NP2 over the normal path NP1. On the left side of the lower normal path NP1, a guardrail-shaped wall 63a as an example of a building object 63 is provided, which is available during the special mode. In the present example, the wall surface part thereof is set to be a first special path SP1. Meanwhile, a roof 63b is provided over the upper normal path NP1. In the present example, the ceiling surface part thereof is set to be a second special path SP2. A third special path is the special path SP3 (the path moving through the space in the gravity direction) exemplified in FIG. 7D, and a description thereof is omitted accordingly.

At the exit of the first special path SP1, a passage 63c is provided where the curve is gentler and the course length is shorter when compared to the normal path NP1. The path SP1a passing through the passage 63c (being a tunnel-shaped passage which is available with the special mode released in the present example) is a path which is available as a continuation of the special path SP1 and which is inaccessible from the route of the normal path NP1.

The ticket gate 63d, a kicker 64a, and stairs 64b exemplified in FIG. 9 are gimmicks arbitrarily set on the course and have individual roles. For example, for a ticket gate 63d in which an attribute which receives the influence of gravity is set, the control of gravity G is performed to open the ticket gate 63d, thereby making the path beyond it available. For a ticket gate 63d in which an attribute which can be destroyed by the power type character type, which will be described later, is set, a character 61 (virtual player) of the power type can destroy the ticket gate 63d and move therethrough, but another type of character cannot move therethrough. When the kicker 64a in the present example is accessed when the vehicle type is "Air ride" (being the virtual vehicle 62a exemplified in FIG. 4A), it plays the role of an ejector (catapult), allowing the virtual vehicle 62a to glide through space and to move to the upper route without passing through the stairs 64b.

As described above, in accordance with the attribute information of the gimmicks, the attribute information of the character 61 (virtual player object), and the attribute information of the virtual vehicle 62, various events can be generated. Furthermore, the present embodiment is a form to which the presence or absence of the influence of the virtual gravity is added as the attribute of each object, allowing more various events to be generated.

An object 66 shown in FIG. 9 is a general vehicle (being a taxi 66a in the present example) object. The present example includes a course on which the general vehicle 66 moves as a part of the racing course. The game processing means 11 controls the action of the general vehicle 66 such as the taxi 66a, and produces a situation in which the general vehicle 66 interferes with the movement of the moving object 60. A path TP1 shown in FIG. 9 is a path formed by a rail-shaped long and narrow course (i.e., a railway), and is set so that it can be accessed only when the character 61 mounting the vehicle object 62 is of the speed type, which will be described later.

Figure 12A:
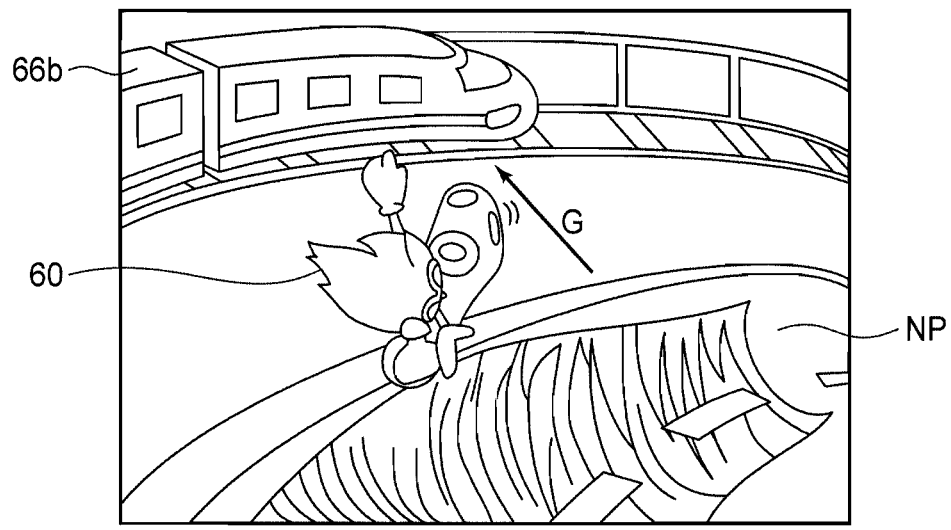
FIG. 12A is a second schematic diagram for illustrating an example for controlling gravity in a special mode of the present invention.

Other special paths will now be described with reference to FIG. 10. In FIG. 10, an elevated railway 63e is provided which is formed along the curve of the normal path NP1 obliquely over the normal path NP1. In the present example, the body side face part of the train 66b moving on the railway track of the elevated railway 63e is set to be a fourth special path SP4. When using the special path SP4, the player activates the special mode, and the moving body 60 and the train 66b move side by side, and, as shown in FIG. 12(A), the direction of gravity G is controlled to be the direction of the side face part of the train 66b. The control allows the moving object 60 to be brought into contact with the side face of the train 66b and allows the side face part of the train 66b to be used as the special path SP4.

Figure 12B:
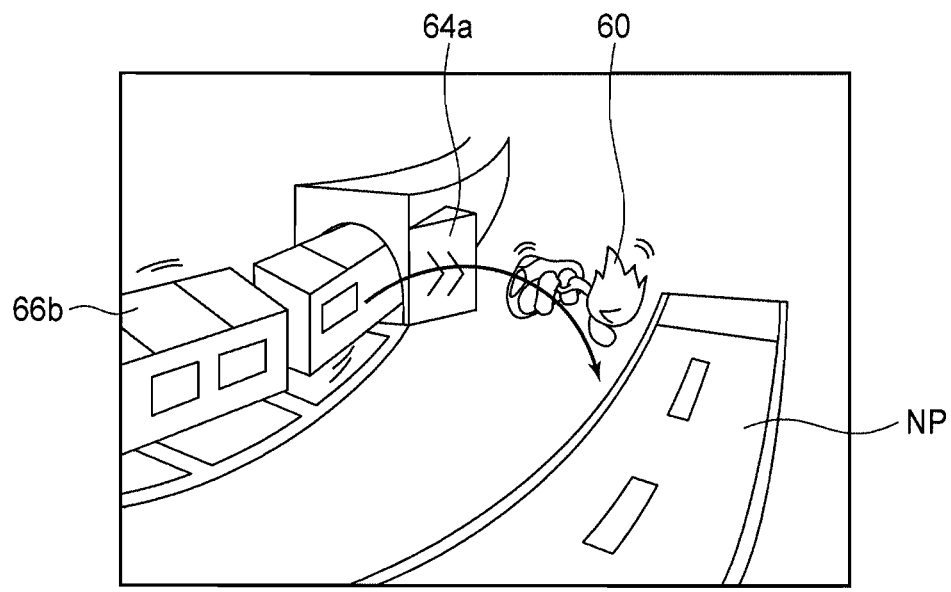
FIG. 12B is a second schematic diagram for illustrating an example for controlling gravity in a special mode of the present invention.

The game processing means 11, when it judges that the moving object 60 is moving on the special path SP4, sets a speed obtained by the addition of the speed of the train 66b and the moving speed of the moving object 60 to be the moving speed of the moving object 60 in the virtual space. As shown in FIG. 12(B), when the moving object 60 leaps down off the train 66b using the kicker 64a, the game processing means 11 regards the timing of passing the kicker 64a provided at a merging point with the normal path NP as the activation terminating time of the special mode, and performs processing for moving the moving object 60 onto the normal path NP at the above-described speed.

In the present example, the use condition of the special path SP4 is made strict, i.e., for example, the height of the moving object 60 and the height of the special path SP4 are compared to each other, and when it is judged that both heights are nearly the same, the activation of the special mode is allowed. For example, in FIG. 10, a special area NP1s for generating an updraft 64c (hereinafter referred to as "turbulence") is provided below the special path SP4, and the height of the special path SP4 cannot be reached without using the turbulence 64c. The turbulence 64c is a virtual spatial area representing the wall of an air stream, and a moving object using the turbulence 64c can move on its track at a higher speed than usual and can reach a height which cannot be normally reached. The turbulence 64c may be a form generated regularly, or may be a form generated at all times. In the present embodiment, the turbulence 64c is, as the wall of an air stream caused by a moving object moving at high speed, generated behind the moving object. The conditions for allowing the fourth special path SP4 to be used in the present example are that another moving object is moving through the special area NP1s at high speed and turbulence 64c is being generated, that being at the height of the elevated railway 63e with a weightless state generated though gravity control along the track of the turbulence 64c of the moving object 60, and that the train 66b is moving alongside.

A fifth special path SP5 is the wall surface part of a wall 63f provided beside the railway track of the elevated railway 63e. The conditions for allowing the fifth special path SP5 to be used are that another moving object is moving through the special area NP1s at high speed and turbulence 64c is being generated, that being at the height of the elevated railway 63e with a weightless state generated though gravity control along the track of the turbulence 64c of the moving object 60, and that the train 66b is not moving alongside.

The above embodiment includes strict use conditions for the special paths SP4 or SP5, so a form in which the condition is only that a special path exists within the special gravity space GS may be used.

A building object 63g shown in FIG. 10 indicates a building such as a hotel. A path TP2 using the roof part of each building 63g is set so that it can be accessed when the character 61 mounting the virtual vehicle 62 is the fly type, which will be described later. The buildings 63g may be arranged in a row and the exterior wall parts of the buildings 63g may be set as the special path.

The type of the character 61 will now be described.

The type of the character 61 includes a plurality of types such as speed type, fly type, and power type. By showing the characteristic ability (characteristics and techniques unique to each character) possessed by each type of character in the race, a specific action in accordance with the ability can be caused.

A speed type character is a character which possesses the ability to allow a virtual vehicle to access the path TP1 installed on the course. A fly type character is a character which possesses the ability to allow a virtual vehicle to fly by passing through an exclusive gimmick installed on the course. The fly type character allows the virtual vehicle to fly and glide through a specific path such as the above-described path TP2 using the roof parts of the above-described buildings 63g installed on the course. The power type character is a character which possesses the ability to destroy obstacles (objects obstructing the movement of the moving object 60) installed on the course, and destroys obstacles ahead by showing the ability, thereby allowing the virtual vehicle to move without needing to avoid the obstacles.

Figure 13:
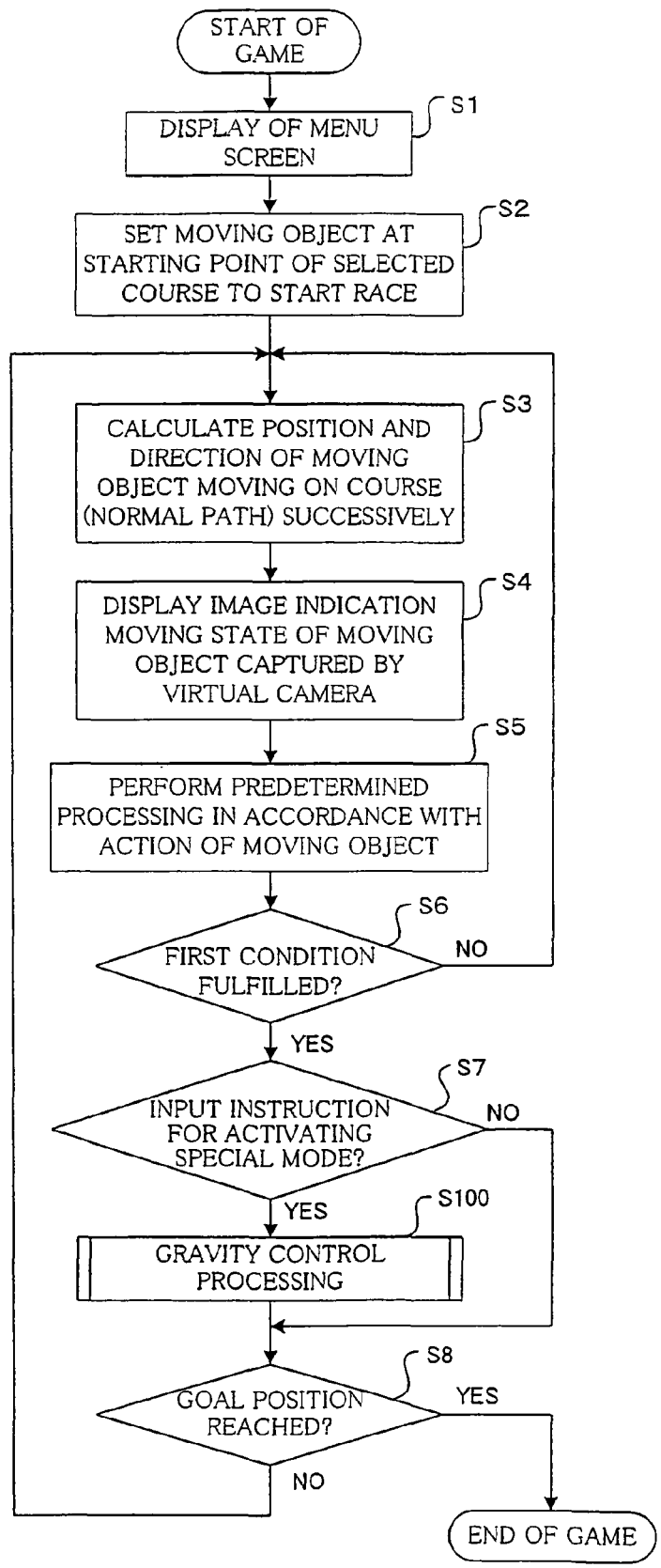
FIG. 13 is a flowchart illustrating the entire flow of a racing game of the present invention.

An operating example of the game device of the present invention will now be described. The entire flow of the racing game of the present invention will be described with reference to the flowchart shown in FIG. 13.

When the game is started through the pressing operation of the start button 21 by a player, the game processing means 11 displays a menu screen showing selectable courses and the moving object 60 (being the character 61 and the virtual vehicle 62) on the display 31, and allows the player to select the course and moving object 60 by clicking the controls or the like on the menu screen (step S1).

The game processing means 11 then sets moving objects including the moving object 60 which takes part in the race at the starting position of the course selected by the player, generates image information of an image in which each moving object is captured by the virtual camera and displays it on the display 31, and starts the race when the countdown indication becomes zero (step S2). When the race is started, the game processing means 11 successively calculates the present position and direction of each moving object (each moving object controlled by each player or the CPU 11) moving on the normal path NP of the course 50 within the three-dimensional virtual space, and updates stored information such as the present position of the moving objects (step S3). Image information representing the present moving conditions obtained by combining the object of the moving object 60 captured by the virtual camera and background objects such as geographic features and buildings into one is successively generated, and is stored in the graphic memory 14b. The game image exemplified in FIG. 5 is displayed on the display 31 through the image processing circuit 14 (step S4).

The game processing means 11 then performs predetermined processing in accordance with the action of the moving object 60, such as point addition processing when acquiring specific items caused by the passing of the moving object 60 (step S5), and judges whether or not each moving object 60 fulfills a condition (referred to as "first condition") to activate the special mode. The "first condition" is either one or more conditions consisting of, for example, a condition where the energy allowing the moving object 60 to move is present, where the moving object 60 controlled by the player has not reached the goal point, where the moving object 60 is not in a spin state, where the activation is not restricted in order to display a specific image effect, and where the moving object 60 is not moving in the opposite direction. In other words, in the present embodiment, the activation of the special mode is basically allowed to be performed at any timing during the game, even if only the energy allowing the moving object 60 to move is present. Where the point value updated in step S5 exceeds a predetermined set value by comparison between the point value and the set value an activation condition (an AND condition) may be added (step S6).

The game processing means 11 then monitors the presence or absence of the activation start instruction (being the inputting of a special mode activation instruction from the controller 2) of the special mode by the player controlling the moving object 60 which fulfills the above-described first condition (step S7), and when it judges that the special mode activation instruction has been input, accepts the gravity control information from the controller 2, and performs gravity control processing (step S100). The gravity control processing will be described later with reference to embodiments included herein.

When the gravity control processing in the above-described step S100 ends, the game processing means 11 judges whether or not all the moving objects have reached the goal position (step S8), and when it judges that they have not reached that position, moves to step S3 to repeat the processing. When it judges that all the moving objects have reached the goal position in step S8, game end processing is performed to end the racing game on the course.

Figure 14:
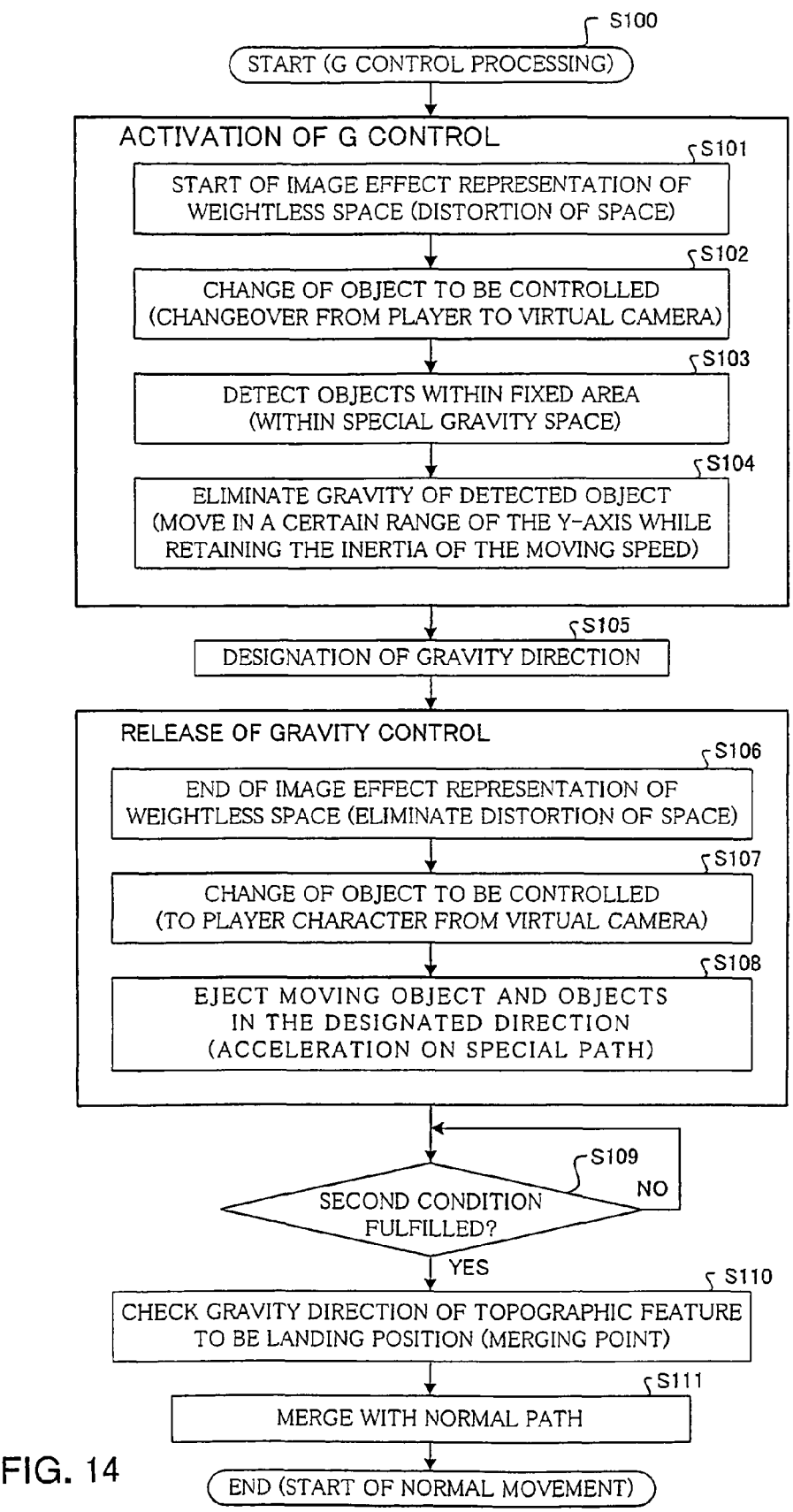
FIG. 14 is a flowchart illustrating the processing of gravity control of the present invention.

The gravity control processing in the above-described step S100 will now be described with respect to the flowchart shown in FIG. 14.

Figure 15:
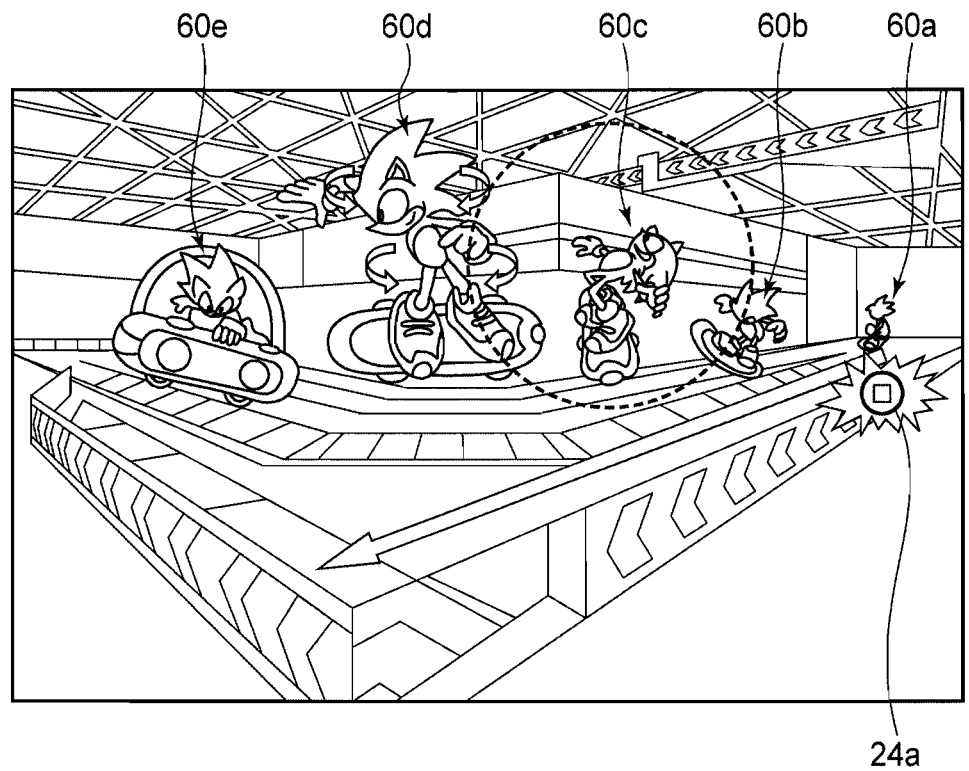
FIG. 15 is a first schematic diagram showing an image generated as a result of gravity control of the present invention.
Figure 16:
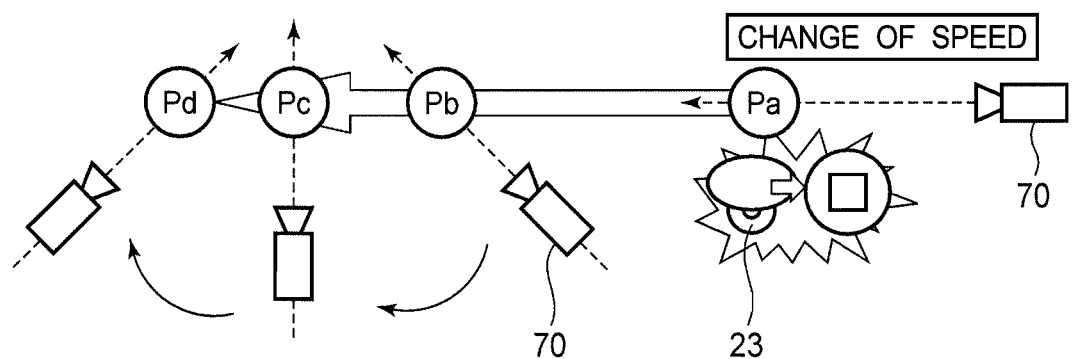
FIG. 16 is a schematic diagram showing an example of a virtual camera operating in a special mode of the present invention.

The game processing means 11, when it judges that the special mode activation conditions are fulfilled, starts the image effect representation of a space in which gravity is eliminated. Hereinafter, the description will be based on the schematic diagram shown in FIG. 15 and on FIG. 16, which shows the example of the virtual camera operating. FIG. 15 is a schematic diagram showing the image generated as a result of gravity control when the special mode is activated on the normal path NP having a sharp curve exemplified in FIG. 7(D), while FIG. 16 is a schematic diagram showing the example of the virtual camera operating at that time. Pa, Pb, Pc, and Pd shown in FIG. 16 indicate the positions of the moving objects 60a, 60b, 60c, and 60d shown in FIG. 15.

The game processing means 11, when it detects that the gravity control (G control) has been activated through information input by the pressing operation of the control button 24a, starts the image effect representation of the space in which gravity is eliminated (step S101), and the object to be controlled by the game processing means 11 is moved from the moving object 60 (hereinafter, the moving object controlled by the player will be referred to as "player character") to the virtual camera 70. Specifically, the attitude (moving direction) of the player character 60 is controlled during normal play, while the position of the virtual camera 70 is controlled with the player character 60 as the center during the G control (step S102).

The game processing means 11, as with the processing for the player character 60 before eliminating gravity, performs processing for gradually decreasing the speed of the player character 60 to a predetermined speed (for example, about 50 km/h), and performs processing for speeding up the action (rot changes of the virtual camera 70) of the virtual camera 70 controlled in proportion to the decreasing speed. The "rot" of the virtual camera 70 indicates rotation, and in the present embodiment, indicates that the point of gaze of the virtual camera 70 moves circularly with the player character 60 as the origin in a direction designated by the arrow key. The circular movement has a stepwise change with an initial speed and a later half speed. The game processing means 11 controls the camerawork of the virtual camera 70 so that in the latter half it is accelerated to move slightly faster.

In the image example, the position of the player character 60a shown in FIG. 15 moves to the position of the player character 60b while slowing down. In accordance with the moving action of the player character, the position of the virtual camera 70 is moved from the position Pa shown in FIG. 16 to the position Pd, and as shown by the arrow in FIG. 16, the direction of the virtual camera 70 is allowed to move circularly, during which processing for charging ambient gravity is performed from the time of the activation of the gravity control (special mode), and the stored value of the charge amount of gravity is successively added. The amount of movement from the position of the player character 60a to the position of the player character 60b while slowing down may be changed in accordance with orders. In this case, distances between the moving objects become shortened, and when recognized by the players, provides more exciting race developments.

The game processing means 11 performs the above-described processing, detects an object within a fixed area (within the above-described special gravity space GS) (step S103), and performs processing for eliminating the gravity of the detected object. In doing so, by targeting each object within the special gravity space GS including the background objects, and by undertaking image processing for altering the apex coordinates of the polygon of each object and changing its shape, a change in gravity in a transition process from the gravity space to the weightless space is represented as the distortion of space (a space time structure). In the image, for example, it is represented by an image in which, for example, an air flow has been changed. In the image example shown in FIG. 15, the attitude and height from the ground are gradually changed within the distorted space, while the state of the player character 60b transitions to the state of the player character 60c. With respect to the objects (the player character and the detected objects) within the special gravity space GS, processing for adding a force to raise them to the height within a fixed range and float them off the ground (processing for moving the position of the object in a certain range of the Y-axis) is performed. The floating range is, in the present embodiment, not fixed, and is allowed to fluctuate slightly with the use of random numbers (step S104).

The player, while watching such an image effect of the weightless space, designates the direction of gravity by the tilting operation of the analog joystick 23 as shown in FIG. 16 (step S105), watches the timing for releasing the gravity control, and performs an instruction for releasing the gravity control (an instruction for releasing the charged gravity in the present example).

The game processing means 11, until the inputting of the instruction for releasing the gravity control, as shown in the player character 60d in FIG. 15, controls the motion of the head and the trunk of the character mounting the virtual vehicle in accordance with the control by the player and the camera position in which, for example, the head of the character is directed to the moving direction, while the trunk of the character is twisted and is directed to the virtual camera 70. Furthermore, as described above, in accordance with the moving action of the player character 60, the position of the virtual camera 70 is moved, and the point of gaze of the virtual camera 70 is moved circularly with the player character 60 as the origin to determine a direction in which gravity is to be released.

The game processing means 11, on detection of the instruction for releasing the gravity control, ends the processing for the image effect representation of the weightless space (step S106), and moves the object for control to the player character 60 from the virtual camera 70 (step S107). Then, the player character 60 and detected objects within the special gravity space GS are ejected in the direction of gravity (G) designated by the tilting operation of the analog joystick 23. The ejection direction (direction in which the charged gravity is released) at that time is a direction designated by the player. The ejection speed is, for example, as described above, a speed (where the maximum speed is, for example, 200 km/h) in accordance with the period of duration of the weightless state (being the charge amount of gravity from the time of the instruction for activating the gravity control to the time of the instruction for releasing). When ejecting the player character 60, the game processing means 11 widens the angle of view of the virtual camera 70, captures the player character 60 which is instantaneously accelerated at the above-described speed with the angle of view and photographs it, draws a ring-shaped effect line around the player character as an image effect, and displays a blurred image as a screen effect as described in the player character 60e shown in FIG. 15. By such image processing, the state in which the gravity energy is released to allow the player character 60e to be accelerated instantaneously is represented (step S108).

The above-described gravity control prepares, in a preferred embodiment, the following two patterns PT1 and PT2.
(PT1) A pattern for causing a gravity change for allowing the player character 60 to take a sharp curve (corner), when the energy of the virtual gravity is released in the designated direction during normal movement, by its gravity control, as shown in the image example shown in FIG. 15.
(PT2) A pattern for causing a gravity change for allowing a three-dimensional route such as a wall or a ceiling set as a special path to be selected, when the energy of the virtual gravity is released in the designated direction after the activation of a trick using a kicker or the like set in the course, by its gravity control.

In the above-described two patterns, the game processing means 11 does not differentiate between the influence on the behavior of the player character 60 itself and the surrounding objects, but in the pattern PT2 only, after ejecting the player character 60, ground paths set at locations other than on the ground and which are set in the virtual three-dimensional space (i.e., special paths such as a wall or a ceiling) are detected. Differentiating between the processing patterns is aimed at conveying the rule to the player when moving to a three-dimensional route and reducing the processing load for path detection by the game processing means 11. The system may include only the gravity control of the above-described processing pattern PT2.

Figure 17:
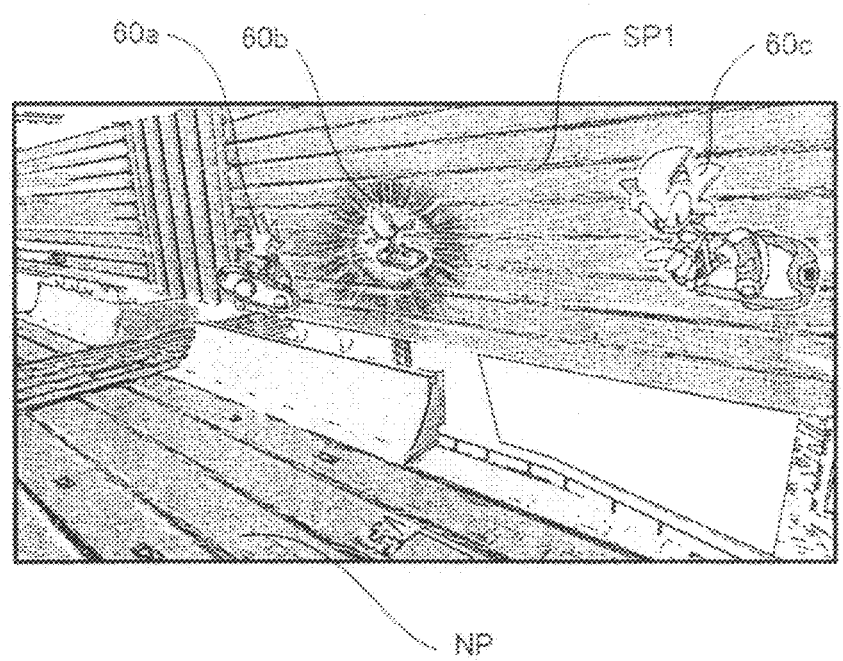
FIG. 17 is a second schematic diagram showing an image generated as a result of gravity control of the present invention.

Another embodiment may be a form in which, when moving from a normal path to a special path in the above-described pattern PT2, the energy of the virtual gravity is released in the direction of the special path while floating in a weightless state without using a kicker or the like, and thereby the player character 60 is moved to the special path. In that case, too, similar image processing may be performed to display the state change of each object in the transition process from normal gravity space to the weightless space and the state of the player character 60 which is accelerated in the special path with the gravity released. For example, for the special path SP1 on the wall surface exemplified in FIG. 7B, as shown in FIG. 17, in the image 60a (being an image example of jumping and moving to the special path SP1 using the kicker in the example shown in FIG. 17) indicating the state of the player character 60, an image floating through the weightlessness may be displayed, and when the energy of the virtual gravity is released toward the wall surface, an image of the state of the player character 60 moved to the wall surface may be displayed. Then an image 60b indicating the state in which it is instantaneously accelerated in the moving direction of the special path SP1 from the state of being moved to the wall surface may be displayed and may be changed to an image 60c.

Following the processing in the above-described step S108, the game processing means 11, for the player character 60 moving on the special path, judges whether or not a condition (referred to as "second condition") of ending the moving on the special path is fulfilled. The "second condition" is for example, where an instruction for ending the activation of the special mode (the inputting of the instruction for ending the activation of the special mode from the controller 2) by the player is accepted, or where the player character 60 has reached the end point of the special path (the merging point with the normal path) (step S109).

When it is judged that the second condition is fulfilled in the above-described step S109, the game processing means 11 displays an image of the state in which the player character 60 is moving on the special path (the state in which the player character 60 is falling through the special path in the G direction in the space in the present example), checks the gravity direction (+/− directions in the XYZ axes) of the topographic feature which is to be a landing position (the merging point from the special path to the normal path) of the player character 60 (step S110), and, while changing the attitude of the player character 60 from the G direction (ejection direction) to the normal gravity direction, allows the player character 60 to land on the landing position and to merge with the normal path (step S111). The game processing means 11 then releases the special mode to end the gravity control processing.

Forms for returning the player character 60 to the ground in the above-described steps S110, S111 include, as described above, (T1), being the form for compulsorily lowering it to the landing position, (T2), being the form for gradually changing the angle of the topographic feature to return it continuously to the ground, and (T3), being the form for returning it to the ground in accordance with gravity control by the player. In the above-described (T3), the player designates the gravity direction toward the topographic feature, watches an image indicating the player character 60e moving on the special path and the topographic feature in front to predict the gravity direction of the topographic feature in the ejection direction, allows the player character 60e to land, while changing the attitude of the character 61 by controlling the controller 2, and allows it to merge with the normal path. The game processing means 11, on the basis of the control information from the controller 2, the topographic feature of the normal path, and the position information of the moving object, performs processing for allowing the player character moving on the special path to merge with the normal path, and generates the image information of its effected image to display it on the display 31.

Figure 18:
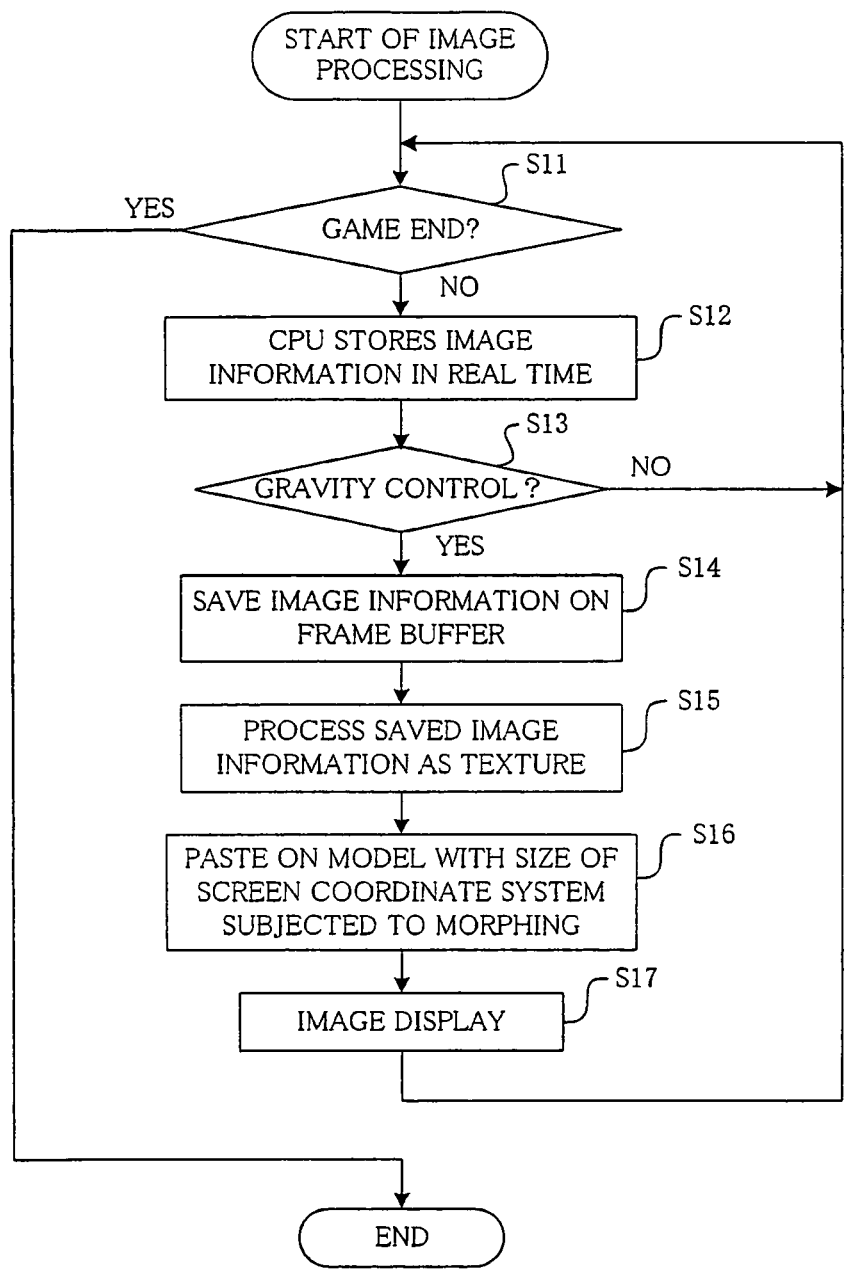
FIG. 18 is a flowchart illustrating image processing during gravity control of the present invention.

Image processing and music change processing during gravity control in the special mode will now be described. First, image processing during gravity control will be described with respect to the flowchart shown in FIG. 18.

The game processing means 11 judges whether or not all the moving objects 60 (the player character 60 in a solo moving game) have reached the goal position to judge whether or not the game has ended (step S11). When it judges that the game has ended, it performs the end processing of the racing game (displaying results such as the order of the player character 60 and an evaluation value concerning the control technique of the player) to end the game on the course.

In step S11, when it judges that the game has not ended, the image information generation means generates image information on the basis of the present position information of the player character 60 and topographic feature information, and allows the generated image information to be stored in the graphic memory 14b in real time (step S12). Then the game image, after being subjected to coordinate conversion processing and rendering processing, is displayed on the display 31.

The game processing means 11 then judges whether or not the control by the player is gravity control (step S13), and when it is not gravity control, returns to step S11 in order to repeat the processing. When it is judged that it is gravity control, the image information of an object (three-dimensional polygon model) within the special gravity space is saved on a frame buffer (step S14), and the image data of the object is processed by the image information generation means with the saved image information as texture. In doing so, for example, a change in the state of an object associated with the elimination of gravity and a change in the state of an object distorted in accordance with a change in gravity are represented by performing image processing in which a distortionless, normal object shape is gradually changed into an object shape distorted in accordance with a change in gravity by morphing processing in the three-dimensional coordinated system. In the processing for ejecting the object in the gravity direction by the instruction for releasing gravity, as described in the above-described step S108, the state of the release of gravity and instantaneous acceleration is represented by performing image processing such as blurring on the texture image or by the combination of an image effect (step S15).

While changing the shape of the object from the distortionless, normal object shape into the distorted shape, the texture image of the three-dimensional polygon model subjected to morphing is pasted on a model with a size similar to a screen coordinate system (step S16), and an image in which the image of the object in the special gravity space and an image outside the special gravity image are combined is displayed (step S17). Moving on to step S11, the image processing is repeated until the end of game is judged in step S21.

Figure 19:
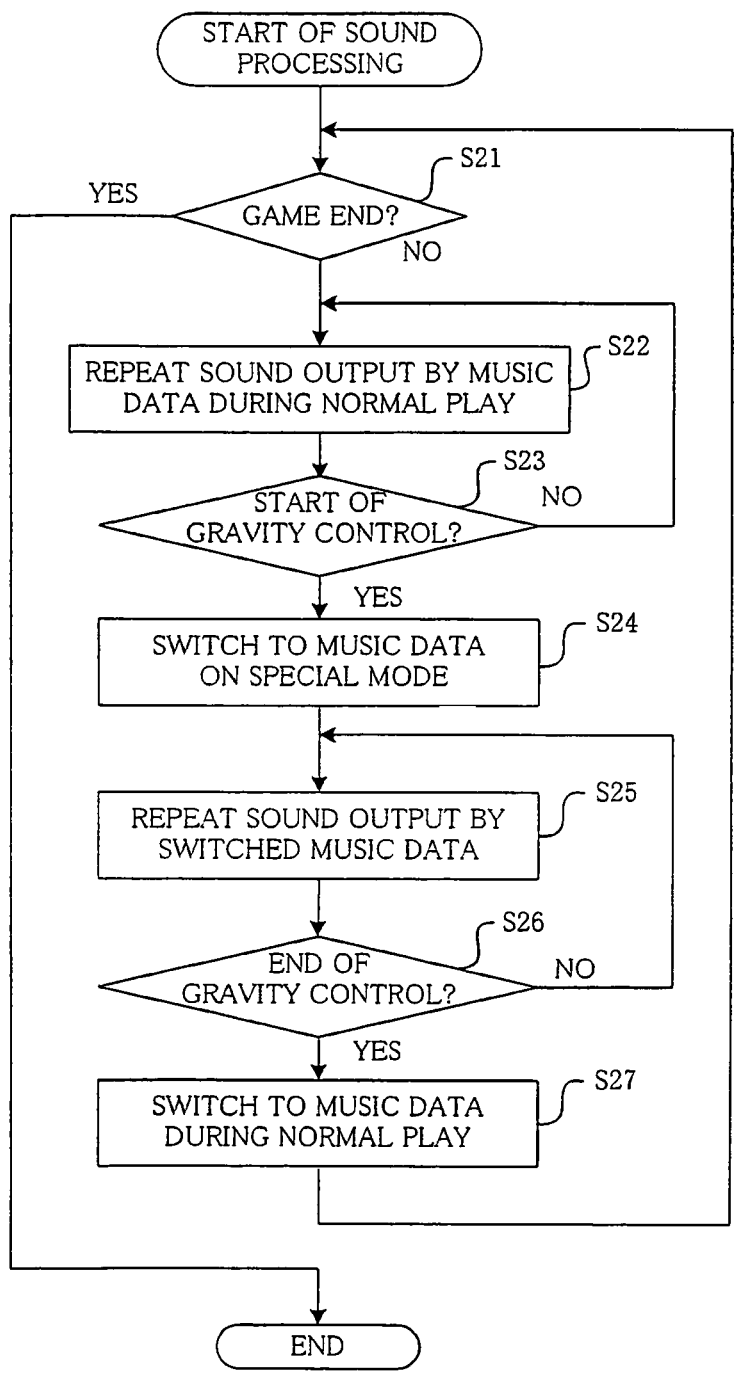
FIG. 19 is a flowchart illustrating sound processing during gravity control of the present invention.

Music change processing in the special mode will now be described with respect to the flowchart shown in FIG. 19.

The game processing means 11 judges whether or not the game has ended (step S21), and when the game has not ended, on the basis of music information operating during normal play generated by a music information generation means, sound data such as BGM is generated by a sound processing circuit 15, and sound output by the music data operating during normal play is repeated (step S22). When it is judged that gravity control has started during the processing in the above-described step S22, the music data operating during normal play is switched to music data (for example, music data having unique sound effects representing a change in gravity or distortion of space) for the special mode (steps S23, S24), and sound output by the switched music data is repeated (step S25). When it is judged that the gravity control has ended (step S26), the music data for the special mode is switched to the music data operating during normal play (step S27). Moving on to step S21, the processing is repeated. When the game processing means 11 judges that the game has ended in step S21, the music processing in the race ends. A large amount of music data operating during normal play may be provided, thereby allowing for the switching to other music data that is different from the one used for the previous normal play in the above-described step S27 each time gravity control is performed.

In the above-described embodiment, the effect of gravity after performing gravity control is independent of the attribute of the moving object. The effect of gravity may be differentiated in accordance with the attribute of the moving object (being the type of character mounting the virtual vehicle, the type of virtual vehicle, the form of the virtual vehicle after parts customization, or the like)

For example, a first example may be a form for adjusting the activation condition and activation time of gravity control in accordance with the type of character, in which, for example, on the basis of the speed type character, or for a fly type character, points for the activation of gravity control are easy to be accumulated, but activation time after actual activation is short, while for a power type character, points for the activation of gravity control are difficult to be accumulated, but activation time after actual activation is short.

A second example is a form for restricting access to a special path during gravity control in accordance with the type of a character. For example, when a special path is set on the ground, a wall, or a ceiling, speed type and power type characters can move on the ground or wall only for a short time, while only a fly type character can move on the ceiling for a long time.

The above embodiment has been described taking an application to a home game device as an example. It should be appreciated that the present invention is not intended to be restricted to home game devices, and can be applied to commercial game devices, general cellular phones having game functions, and the like.

The invention claimed is:

1. A non-transitory computer-readable storage medium having a computer program stored thereon, the computer program for allowing a computer of a game device provided with (i) operating means controlled by a player and (ii) image display means for displaying images on a monitor to perform game processing steps including an image information generation step of generating game images including a moving object moving in a virtual space in response to a control of the operating means, and the computer program causing the computer of the game device to execute said game processing steps comprising:
   a step of setting a plurality of paths in the virtual space in advance as a course for the moving object;
   a step of setting, for the plurality of paths, a first path used during normal movement and a second path used only while a special mode is activated, the special mode being a mode in which a starting point diverging from the first path is set as a diverging point and an end point merging with the first path is set as a predetermined merging point;
   a step of judging whether or not the moving object fulfills an activating condition for activating the special mode;
   a step of allowing, when the special mode is activated by an activation instruction from the operating means controlling the moving object which has been judged to fulfill the activating condition for activating the special mode, the moving object to move onto the second path;
   a step of judging whether or not the moving object, while moving on the second path, fulfills a cancelling condition for cancelling the activation of the special mode;
   a step of setting, when said step of judging whether or not the moving object fulfills the cancelling condition for cancelling the activation of the special mode judges that the cancelling condition for cancelling the activation of the special mode is fulfilled, a variable merging point which merges with the first path at a merging point other than the predetermined merging point based on a position of the moving object moving on the second path;
   a step of allowing, when said step of judging whether or not the moving object fulfills the cancelling condition for cancelling the activation of the special mode judges that the cancelling condition for cancelling the activation of the special mode is fulfilled, the moving object moving on the second path to merge at the variable merging point; and
   a step of allowing, when said step of judging whether or not the moving object fulfills the cancelling condition for cancelling the activation of the special mode judges that the cancelling condition for cancelling the activation of the special mode is not fulfilled, the moving object moving on the second path to merge at the predetermined merging point.

2. The non-transitory computer-readable storage medium according to claim 1, wherein the special mode is a mode allowing a direction of physical gravity to be designated by the control of the operating means.

3. The non-transitory computer-readable storage medium according to claim 1, wherein the second path is a path having a course which is physically impossible in the real world.

4. The non-transitory computer-readable storage medium according to claim 3, wherein the second path includes either one of a path setting a wall surface section of a moving object including a train to be the course, a path setting a ceiling surface section of a building to be the course, or a path setting a wall section of the building to be the course.

5. The non-transitory computer-readable storage medium according to claim 2, wherein said game processing steps further include:
   a step of changing the direction of the physical gravity to a direction designated by the operating means;
   a step of allowing virtual gravity to act in the changed direction; and
   a step of performing ejection processing for ejecting the moving object controlled by the player in the designated direction.

6. The non-transitory computer-readable storage medium according to claim 5,
   wherein said game processing steps further include:
      a step of adding an energy value of the virtual gravity in accordance with a passage of time for a duration from a time of activation of the special mode to a time of issue of an instruction for releasing an energy of the virtual gravity toward the designated direction; and
      a step of storing the added energy value in a storage means as a charge amount, and
   wherein said step of performing the ejection processing converts a force acting upon the moving object controlled by the player into a speed corresponding to the charge amount of the virtual gravity when the instruction for releasing the energy of the virtual gravity is issued and ejects the moving object at the converted speed.

7. The non-transitory computer-readable storage medium according to claim 2, wherein a range of virtual gravity acting in the direction designated by the operating means is within a special gravity space set around the moving object controlled by the player.

8. The non-transitory computer-readable storage medium according to claim 7, wherein said game processing steps further include:
   a step of eliminating gravity in the special gravity space; and a step of performing processing for floating objects within the special gravity space including the moving object controlled by the player in accordance with a passage of time for a duration from a time of activation of the special mode to a time of issue of an instruction for releasing an energy of the virtual gravity toward the designated direction.

9. The non-transitory computer-readable storage medium according to claim 2, wherein said game processing steps further include a step of performing image processing which gradually changes a non-distorted normal object shape into an object shape distorted by an action of the virtual gravity on objects influenced by the virtual gravity acting in the direction designated by the operating means.

10. The non-transitory computer-readable storage medium according to claim 1, wherein said game processing steps further include a step of changing music data for sound output with the activation of the special mode as a trigger when the special mode is activated by the activation instruction to activate the special mode.

11. A game device provided with operating means controlled by a player, image display means for displaying images on a monitor, and game processing means including image information generation means for generating game images including a moving object moving in a virtual space in response to a control of said operating means, wherein said game processing means comprises:

means for setting a plurality of paths in the virtual space in advance as a course for the moving object;

means for setting, for the plurality of paths, a first path used during normal moving and a second path used only while a special mode is activated, the special mode being a mode in which a starting point diverging from the first path is set as a diverging point and an end point merging with the first path is set as a predetermined merging point;

means for judging whether or not the moving object fulfills an activating condition for activating the special mode;

means for allowing, when the special mode is activated by an activation instruction from said operating means controlling the moving object which has been judged to fulfill the activating condition for activating the special mode, the moving object to move onto the second path;

means for judging whether or not the moving object, while moving on the second path, fulfills a cancelling condition for cancelling the activation of the special mode;

means for setting, when said means for judging whether or not the moving object fulfills the cancelling condition for cancelling the activation of the special mode judges that the cancelling condition for cancelling the activation of the special mode is fulfilled, a variable merging point which merges with the first path at a merging point other than the predetermined merging point based on a position of the moving object moving on the second path;

means for allowing, when said means for judging whether or not the moving object fulfills the cancelling condition for cancelling the activation of the special mode judges that the cancelling condition for cancelling the activation of the special mode is fulfilled, the moving object moving on the second path to merge at the variable merging point; and means for allowing, when said means for judging whether or not the moving object fulfills the cancelling condition for cancelling the activation of the special mode judges that the cancelling condition for cancelling the activation of the special mode is not fulfilled, the moving object moving on the second path to merge at the predetermined merging point.

* * * * *